United States Patent
Bergström et al.

(10) Patent No.: US 10,440,600 B2
(45) Date of Patent: Oct. 8, 2019

(54) PROVIDING MEASUREMENT REPORTS

(71) Applicant: Telefonaktiebolaget LM Ericsson (publ), Stockholm (SE)

(72) Inventors: Mattias Bergström, Stockholm (SE); Imadur Rahman, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/759,843

(22) PCT Filed: Sep. 26, 2016

(86) PCT No.: PCT/SE2016/050905
§ 371 (c)(1),
(2) Date: Mar. 14, 2018

(87) PCT Pub. No.: WO2017/052464
PCT Pub. Date: Mar. 30, 2017

(65) Prior Publication Data
US 2018/0270686 A1    Sep. 20, 2018

Related U.S. Application Data

(60) Provisional application No. 62/232,765, filed on Sep. 25, 2015.

(51) Int. Cl.
*H04L 12/28* (2006.01)
*H04W 24/10* (2009.01)
(Continued)

(52) U.S. Cl.
CPC ........... *H04W 24/10* (2013.01); *H04W 16/32* (2013.01); *H04W 56/0015* (2013.01); *H04W 72/10* (2013.01); *H04W 76/15* (2018.02)

(58) Field of Classification Search
CPC .. H04W 24/10; H04W 56/0015; H04W 72/10
(Continued)

(56) References Cited

U.S. PATENT DOCUMENTS

2011/0085460 A1* 4/2011 Zhang ................. H04B 7/024
                                                                370/252
2012/0015667 A1* 1/2012 Woo ..................... G01S 5/0221
                                                                455/456.1
(Continued)

FOREIGN PATENT DOCUMENTS

WO    2012119626 A1    9/2012
WO    2015081984 A1    6/2015
(Continued)

OTHER PUBLICATIONS

Unknown, Author, "Discussion on SFN and subframe offset reporting for dual connectivity", 3GPP TSG-RAN WG4 Meeting #76, R4-154385, Beijing, China, Aug. 24-28, 2015, 1-4.
(Continued)

*Primary Examiner* — John Pezzlo
(74) *Attorney, Agent, or Firm* — Sage Patent Group

(57) ABSTRACT

A network node in a cellular communications network sends a timing measurement command to a terminal device in the cellular communications network. The terminal device receives the timing measurement command from the network; determines whether to select at least one cell of the network; and reports timing information for any selected cell to the network.

13 Claims, 18 Drawing Sheets

(51) Int. Cl.
*H04W 76/15* (2018.01)
*H04W 56/00* (2009.01)
*H04W 16/32* (2009.01)
*H04W 72/10* (2009.01)
*H04J 1/16* (2006.01)

(58) Field of Classification Search
USPC .......................................... 370/252, 329, 503
See application file for complete search history.

(56) References Cited

U.S. PATENT DOCUMENTS

2013/0337767 A1* 12/2013 Siomina ................ G01S 5/0009
455/404.2
2015/0092738 A1* 4/2015 Chakraborty ......... H04L 5/0005
370/330

FOREIGN PATENT DOCUMENTS

| WO | 2015105363 | A1 | 7/2015 |
| WO | 2015122695 | A1 | 8/2015 |
| WO | 2015158750 | A1 | 10/2015 |
| WO | 2015176934 | A1 | 11/2015 |
| WO | 2016163936 | A1 | 10/2016 |
| WO | 2016168178 | A1 | 10/2016 |

OTHER PUBLICATIONS

Unknown, Author, "E-UTRAN FDD-FDD Intra-Frequency Event Triggered Reporting under Fading Propagation Conditions in Synchronous Cells", 3GPP TS 36.133 V12.7.0, Release 12, Mar. 2015, pp. 1-2.

Unknown, Author, "LS on UE based timing offset reporting for DC enhancement", 3GPP TSG-RAN WG4 Meeting #76, R4-154844, Beijing, China, Aug. 24-28, 2015, 1-2.

* cited by examiner

PROVIDING MEASUREMENT REPORTS

TECHNICAL FIELD

Aspects of this disclosure relate to operating a terminal device in a communications network, and to nodes for use in the network.

BACKGROUND

Long-Term Evolution (LTE) uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval.

As shown in FIG. 2, in the time domain, LTE downlink transmissions are organized into radio frames of for example, 10 ms, each radio frame consisting of ten equally-sized subframes of length $T_{subframe}=1$ ms.

Furthermore, the resource allocation in LTE is typically described in terms of Resource Blocks (RBs) where a resource block corresponds to one slot (0.5 ms) in the time domain and twelve contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a terminal device is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI) indicated by the physical CFI channel (PCHICH) transmitted in the first symbol of the control region. The control region also contains physical downlink control channels (PDCCH) and possibly also physical Hybrid Automatic Repeat Request (HARQ) indication channels (PHICH) carrying acknowledgements for the uplink transmission.

The downlink subframe also contains common reference symbols (CRS), which are known to the receiver and used for coherent demodulation of e.g. the control information. A downlink system with CFI=3 OFDM symbols as control is illustrated in FIG. 3.

In dual connectivity (DC) a terminal device can be served by two nodes called master eNB (MeNB) and secondary eNB (SeNB). The terminal device is configured with a primary component carrier (PCC) from both the MeNB and the SeNB. The primary cell from the MeNB and the SeNB are called a PCell and PSCell respectively. The PCell and PSCell typically operate the terminal device independently. The terminal device is also configured with one or more Secondary Component Carriers (SCCs) from each of MeNB and SeNB. The corresponding secondary serving cells served by MeNB and SeNB are called SCells. The terminal device in DC typically has separate transmitting and receiving functions for each of the connections with MeNB and SeNB. This allows the MeNB and SeNB to independently configure the terminal device with one or more procedures e.g. radio link monitoring (RLM), discontinuous reception cycle etc. on their PCell and PSCell respectively.

SUMMARY

According to aspects of certain embodiments disclosed herein, there is provided a method of operating a terminal device in a cellular communications network. The method comprises: receiving a timing measurement command from the network; determining whether to select at least one cell of the network; and reporting timing information for any selected cell to the network.

The cellular communications network may be a Long Term Evolution, LTE, network, in which case the method may comprise receiving said timing measurement command from an eNodeB of the network, and/or reporting said timing information to an eNodeB of the network.

Said timing information may comprise information relating to a timing difference between the at least one selected cell and a reference cell, and the reference cell may be a cell that is already configured for the user terminal, or a PCell for the user terminal. The timing information may comprise information relating to a subframe timing difference between the at least one selected cell and a reference cell, as measured at the terminal device.

The method may further comprise, in response to receiving the timing measurement command from the network, from a plurality of cells of the network, selecting only the or each cell that meets at least one predetermined condition, or alternatively selecting only one or more cell that meets at least one predetermined condition. The predetermined condition may be that the timing difference of the cell compared with a reference cell is below a threshold value. The method may comprise determining the timing difference of the cell compared with the reference cell based on a subframe boundary offset, determining the timing difference of the cell compared with the reference cell based on a frame boundary offset, and/or determining the timing difference of the cell compared with the reference cell based on a system frame number, SFN, offset.

The predetermined condition may be that the timing difference, as measured by one of multiple metrics, is below a threshold value; or that the timing difference, as measured by more than one of multiple metrics, is below a threshold value; or that the timing difference, as measured by all of multiple metrics, is below a threshold value. The threshold value may be such that the cell is considered to be synchronous with the reference cell. The threshold value may be determined by the terminal device, or indicated to the terminal device by the network, or predefined and known to the terminal device and the network.

The method may comprise determining the timing difference of the cell compared with the reference cell based on a metric notified to the terminal device by the network. The method may then comprise: receiving at least one threshold value notified to the terminal device by the network; inferring a metric based on the or each said threshold value; and determining the timing difference of the cell compared with the reference cell based on the or each inferred metric.

The method may comprise determining the timing difference of the cell compared with the reference cell based on a metric selected by the terminal device.

When the predetermined condition is that the timing difference of the cell is compared with a reference cell, the reference cell may be an existing serving cell, for example a PCell for the user terminal, or a cell notified to the terminal device by the network.

The predetermined condition may be that the terminal device is capable of specific functionality in the cell, for example that the terminal device is capable of performing dual connectivity with the cell and with an existing serving cell. The terminal device may consider a combination of the cell and a reference cell when determining if the terminal is capable of the specific functionality in the cell. The predetermined condition may be that the terminal device is capable of performing synchronous dual connectivity with the cell and with an existing serving cell. The predetermined condition may be that the terminal device is capable of supporting a maximum transmission timing difference that is greater than the transmission timing difference required to transmit in the cell and in the reference cell.

The method may comprise determining whether or not to apply the predetermined condition that the terminal device is capable of specific functionality in the cell, in response to a configuration from the network.

The predetermined condition may relate to a frequency used by the cell, in which case the predetermined condition may be that the frequency used by the cell is spaced from the frequency used by an existing serving cell by a frequency difference exceeding a threshold value, or that the frequency used by the cell has no harmonic or intermodulation relationships with the frequency used by an existing serving cell, or that the frequency used by the cell has no transmission power restrictions due to transmissions on the frequency used by an existing serving cell.

The predetermined condition may relate to a duplex mode used by the cell, in which case the predetermined condition may be that the duplex mode used by the cell is the same as the duplex mode used by an existing serving cell.

The method may comprise, in response to receiving the timing measurement command from the network: obtaining timing information for a plurality of cells of the network; allocating different priorities to said cells; and reporting to the network timing information for a subset of said cells having highest priorities.

In that case, the method may comprise reporting to the network timing information for a predetermined maximum number of said cells having the highest allocated priorities, and the maximum number of cells may be predetermined and known to the terminal device, or the method may comprise receiving from the network information specifying said maximum number of said cells.

Reporting to the network the timing information for said subset of said cells may comprise sending a list to the network, with the cells being listed in the report in order of their allocated priorities.

The method may comprise: allocating a higher priority to at least one cell with which the terminal device is capable of performing dual connectivity than to at least one cell with which the terminal device is not capable of performing dual connectivity; or allocating a higher priority to at least one cell with which the terminal device is capable of performing synchronous dual connectivity than to at least one cell with which the terminal device is not capable of performing synchronous dual connectivity; or allocating priorities to said cells based on respective timing differences of the cells compared with a reference cell, allocating higher priorities to cells having smaller timing differences compared with the reference cell. The timing difference may be a subframe timing difference. The reference cell may be an existing serving cell, for example a PCell for the user terminal, or the reference cell may be a cell notified to the terminal device by the network.

The method may comprise: allocating a higher priority to at least one cell which has a timing difference compared with a reference cell that is lower than a threshold value, than to at least one cell which has a timing difference compared with a reference cell that is higher than the threshold value. The threshold value may be the sum of a predetermined timing difference and an offset value, in which case the predetermined timing difference is a standardized limit for synchronous dual connectivity; and/or the offset value may be signaled to the terminal device by the network, the method may comprise determining the offset value in the terminal device, or the method may comprise determining the offset value in the terminal device as an estimate of measurement uncertainty. The offset value may be either positive or negative.

The method may comprise determining the timing difference of the cell compared with the reference cell based on a metric notified to the terminal device by the network, in which case the method may comprise: receiving at least one threshold value notified to the terminal device by the network; inferring a metric based on the or each said threshold value; and determining the timing difference of the cell compared with the reference cell based on the or each inferred metric.

The method may comprise determining the timing difference of the cell compared with the reference cell based on a metric selected by the terminal device.

When the method comprises: obtaining timing information for a plurality of cells of the network; allocating different priorities to said cells; and reporting to the network timing information for a subset of said cells having highest priorities, the method may further comprise: allocating a higher priority to at least one serving cell with which the terminal device is already configured than to at least one other cell with which the terminal device is not configured, and specifically allocating a higher priority to at least one cell listed by the network in the configuration of the terminal device than to at least one other cell detected by the terminal device but not listed by the network in the configuration of the terminal device. The method may comprise including the at least one serving cell in a separate list from the at least one other cell with which the terminal device is not configured.

When the method comprises: obtaining timing information for a plurality of cells of the network; allocating different priorities to said cells; and reporting to the network timing information for a subset of said cells having highest priorities, the method may further comprise allocating a higher priority to at least one cell suggested by the network as a measurement cell than to at least one other cell not suggested by the network.

According to another aspect, there is provided a computer program product comprising a computer readable medium having computer readable code embodied therein, the computer readable code being configured such that, on execution by a suitable computer or processor, the computer or processor is caused to perform the method of any of the preceding embodiments.

According to a further aspect, there is provided a terminal device for use in a cellular communications network. The terminal device is adapted to receive a timing measurement command from the network; determine whether to select at least one cell of the network; and report timing information for any selected cell to the network.

The cellular communications network may be a Long Term Evolution, LTE, network, in which case the terminal device may be adapted to receive said timing measurement command from an eNodeB of the network, and/or the terminal device may be adapted to report said timing information to an eNodeB of the network.

The timing information may comprise information relating to a timing difference between the at least one selected cell and a reference cell, in which case said reference cell may be a cell that is already configured for the user terminal, or said reference cell may be a PCell for the user terminal. The timing information may comprise information relating to a subframe timing difference between the at least one selected cell and a reference cell, as measured at the terminal device.

The terminal device may be configured for, in response to receiving the timing measurement command from the network, from a plurality of cells of the network, selecting only the or each cell that meets at least one predetermined condition, or alternatively selecting only one or more cell that meets at least one predetermined condition. The predetermined condition may be that the timing difference of the cell compared with a reference cell is below a threshold value. The terminal device may be adapted to determine the timing difference of the cell compared with the reference cell based on a subframe boundary offset, and/or based on a frame boundary offset, and/or based on a system frame number, SFN, offset. The predetermined condition may be that the timing difference, as measured by any one of multiple metrics, is below a threshold value; or may be that the timing difference, as measured by more than one of multiple metrics, is below a threshold value; or may be that the timing difference, as measured by all of multiple metrics, is below a threshold value. The threshold value may be such that the cell is considered to be synchronous with the reference cell. The threshold value may be determined by the terminal device, or the threshold value may be indicated to the terminal device by the network, or the threshold value may be predefined and known to the terminal device and the network.

The terminal device may be adapted to determine the timing difference of the cell compared with the reference cell based on a metric notified to the terminal device by the network, in which case the terminal device may be adapted to: receive at least one threshold value notified to the terminal device by the network; infer a metric based on the or each said threshold value; and determine the timing difference of the cell compared with the reference cell based on the or each inferred metric.

The terminal device may be adapted to determine the timing difference of the cell compared with the reference cell based on a metric selected by the terminal device.

When the terminal device is configured for, in response to receiving the timing measurement command from the network, from a plurality of cells of the network, selecting only the or each cell that meets at least one predetermined condition, and the predetermined condition is that the timing difference of the cell compared with a reference cell is below a threshold value, the reference cell may be an existing serving cell, and may be a PCell for the user terminal. The reference cell may be a cell notified to the terminal device by the network.

When the terminal device is configured for, in response to receiving the timing measurement command from the network, from a plurality of cells of the network, selecting only the or each cell that meets at least one predetermined condition, the predetermined condition may be that the terminal device is capable of specific functionality in the cell, and in that case the predetermined condition may be that the terminal device is capable of performing dual connectivity with the cell and with an existing serving cell, and in particular may be that the terminal device is capable of performing synchronous dual connectivity with the cell and with an existing serving cell. The terminal device may consider a combination of the cell and a reference cell when determining if the terminal is capable of the specific functionality in the cell.

Alternatively, the predetermined condition may be that the terminal device is capable of supporting a maximum transmission timing difference that is greater than the transmission timing difference required to transmit in the cell and in the reference cell.

When the predetermined condition is that the terminal device is capable of specific functionality in the cell, the terminal device may be adapted to determine whether or not to apply the predetermined condition that the terminal device is capable of specific functionality in the cell, in response to a configuration from the network.

The predetermined condition may relate to a frequency used by the cell, and may be that the frequency used by the cell is spaced from the frequency used by an existing serving cell by a frequency difference exceeding a threshold value; or that the frequency used by the cell has no harmonic or intermodulation relationships with the frequency used by an existing serving cell; or that the frequency used by the cell has no transmission power restrictions due to transmissions on the frequency used by an existing serving cell.

The predetermined condition may relate to a duplex mode used by the cell, and may be that the duplex mode used by the cell is the same as the duplex mode used by an existing serving cell.

The terminal device may be adapted to, in response to receiving the timing measurement command from the network: obtain timing information for a plurality of cells of the network; allocate different priorities to said cells; and report to the network timing information for a subset of said cells having highest priorities. The terminal device may be adapted to report to the network timing information for a predetermined maximum number of said cells having the highest allocated priorities, and said maximum number of cells may be predetermined and known to the terminal device, or the terminal device may be adapted to receive from the network information specifying said maximum number of said cells.

Reporting to the network the timing information for said subset of said cells may comprise sending a list to the network, with the cells being listed in the report in order of their allocated priorities.

The terminal device may be adapted to: allocate a higher priority to at least one cell with which the terminal device is capable of performing dual connectivity than to at least one cell with which the terminal device is not capable of performing dual connectivity.

The terminal device may be adapted to: allocate a higher priority to at least one cell with which the terminal device is capable of performing synchronous dual connectivity than to at least one cell with which the terminal device is not capable of performing synchronous dual connectivity.

The terminal device may be adapted to: allocate priorities to said cells based on respective timing differences of the cells compared with a reference cell, allocating higher priorities to cells having smaller timing differences compared with the reference cell, in which case said timing difference may be a subframe timing difference, and/or the reference cell may be an existing serving cell, specifically a PCell for the user terminal. The reference cell may be a cell notified to the terminal device by the network.

The terminal device may be adapted to: allocate a higher priority to at least one cell which has a timing difference compared with a reference cell that is lower than a threshold value, than to at least one cell which has a timing difference compared with a reference cell that is higher than the threshold value. The threshold value may then be the sum of a predetermined timing difference and an offset value, and the predetermined timing difference may then be a standardized limit for synchronous dual connectivity, and/or the offset value may be signaled to the terminal device by the network, the terminal device may be adapted to determine the offset value in the terminal device, or the terminal device may be adapted to determine the offset value in the terminal device as an estimate of measurement uncertainty. The offset value may be either positive or negative.

The terminal device may be adapted to determine the timing difference of the cell compared with the reference cell based on a metric notified to the terminal device by the network, in which case the terminal device may be adapted to: receive at least one threshold value notified to the terminal device by the network; infer a metric based on the or each said threshold value; and determine the timing difference of the cell compared with the reference cell based on the or each inferred metric.

The terminal device may be adapted to determine the timing difference of the cell compared with the reference cell based on a metric selected by the terminal device.

The terminal device may be adapted to: allocate a higher priority to at least one serving cell with which the terminal device is already configured than to at least one other cell with which the terminal device is not configured, in which case the terminal device may be adapted to: allocate a higher priority to at least one cell listed by the network in the configuration of the terminal device than to at least one other cell detected by the terminal device but not listed by the network in the configuration of the terminal device.

The terminal device may be adapted to: include the at least one serving cell in a separate list from the at least one other cell with which the terminal device is not configured.

The terminal device may be adapted to: allocate a higher priority to at least one cell suggested by the network as a measurement cell than to at least one other cell not suggested by the network.

According to certain embodiments there is provided a terminal device for use in a cellular communications network. The terminal device comprises a receiving module for receiving a timing measurement command from the network; a determining module for determining whether to select at least one cell of the network; and a reporting module for reporting timing information for any selected cell to the network.

According to some embodiments there is provided a method of operating a network node for use in a cellular communications network. The method comprises sending a timing measurement command to a terminal device in the cellular communications network; and receiving from the terminal device a report containing timing information for at least one selected cell in the network.

The method may comprise notifying to the terminal device a timing difference threshold value.

The method may comprise notifying to the terminal device a metric to be used by the terminal device in measuring the timing difference.

The method may further comprise notifying to the terminal device a cell to be used as a reference cell for measuring the timing difference.

The method may further comprise notifying to the terminal device a maximum number of cell to be included in said report.

The method may further comprise notifying to the terminal device an offset value to be used by the terminal device in determining a threshold value for the timing difference.

The method may further comprise notifying to the terminal device at least one suggested cell for which timing information should be obtained.

According to another aspect, there is provided a computer program product comprising a computer readable medium having computer readable code embodied therein, the computer readable code being configured such that, on execution by a suitable computer or processor, the computer or processor is caused to perform the method of any of the preceding embodiments.

According to particular embodiments there is provided a network node for use in a cellular communications network. The network node is adapted to: send a timing measurement command to a terminal device in the cellular communications network; and receive from the terminal device a report containing timing information for at least one selected cell in the network.

The network node may be further adapted to notify to the terminal device a timing difference threshold value.

The network node may be further adapted to notify to the terminal device a metric to be used by the terminal device in measuring the timing difference.

The network node may be further adapted to notify to the terminal device a cell to be used as a reference cell for measuring the timing difference.

The network node may be further adapted to notify to the terminal device a maximum number of cell to be included in said report.

The network node may be further adapted to notify to the terminal device an offset value to be used by the terminal device in determining a threshold value for the timing difference.

The network node may be further adapted to notify to the terminal device at least one suggested cell for which timing information should be obtained.

According to some embodiments there is provided a network node for use in a cellular communications network. The network node comprises a sending module for sending a timing measurement command to a terminal device in the cellular communications network; and a receiving module for receiving from the terminal device a report containing timing information for at least one selected cell in the network.

BRIEF DESCRIPTION OF THE DRAWINGS

Features, objects and advantages of the presently disclosed techniques will become apparent to those skilled in the art by reading the following detailed description where references will be made to the appended figures in which.

DETAILED DESCRIPTION

Figure 1:
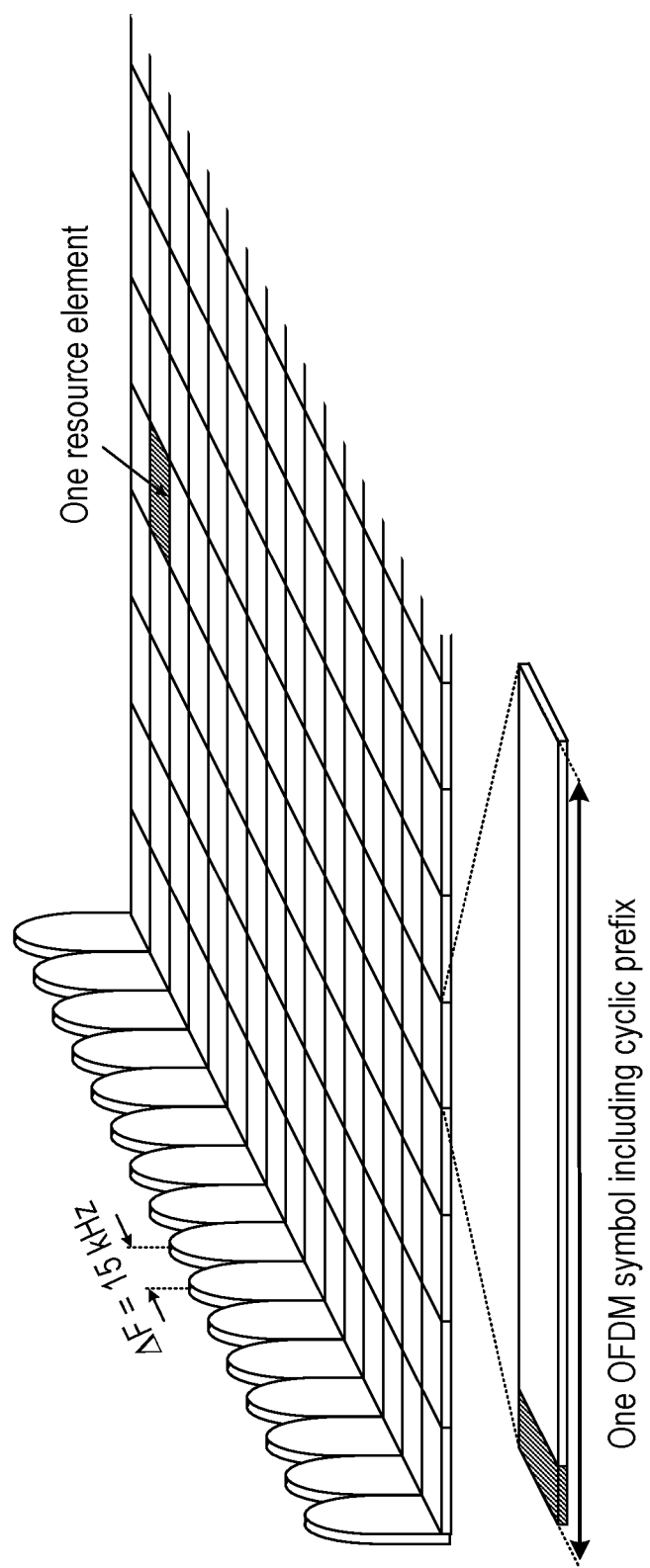
FIG. 1 illustrates resource elements in an LTE system.
Figure 2:
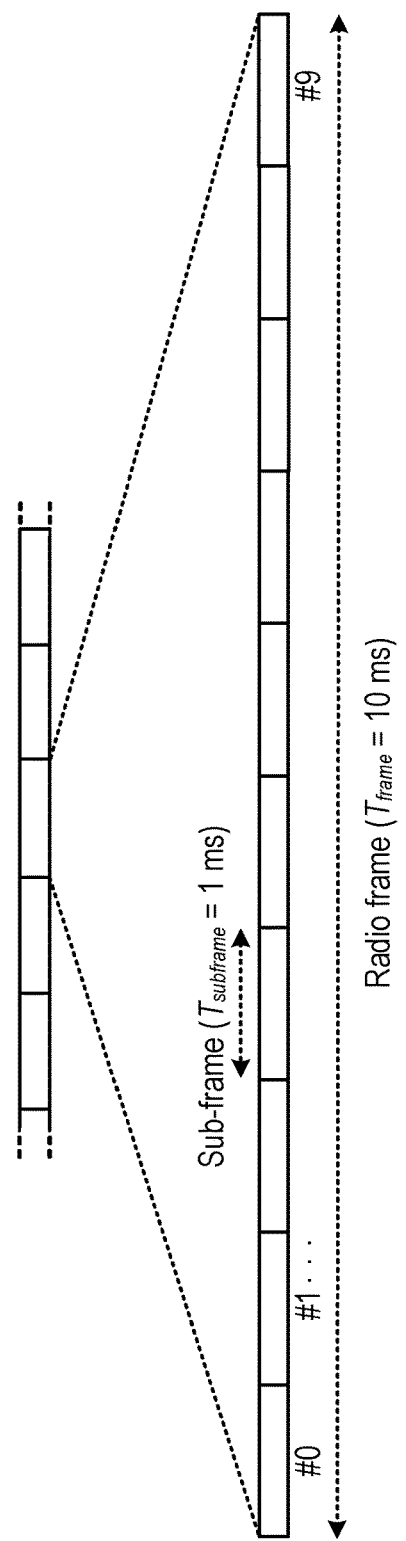
FIG. 2 illustrates frames and subframes in an LTE system.
Figure 3:
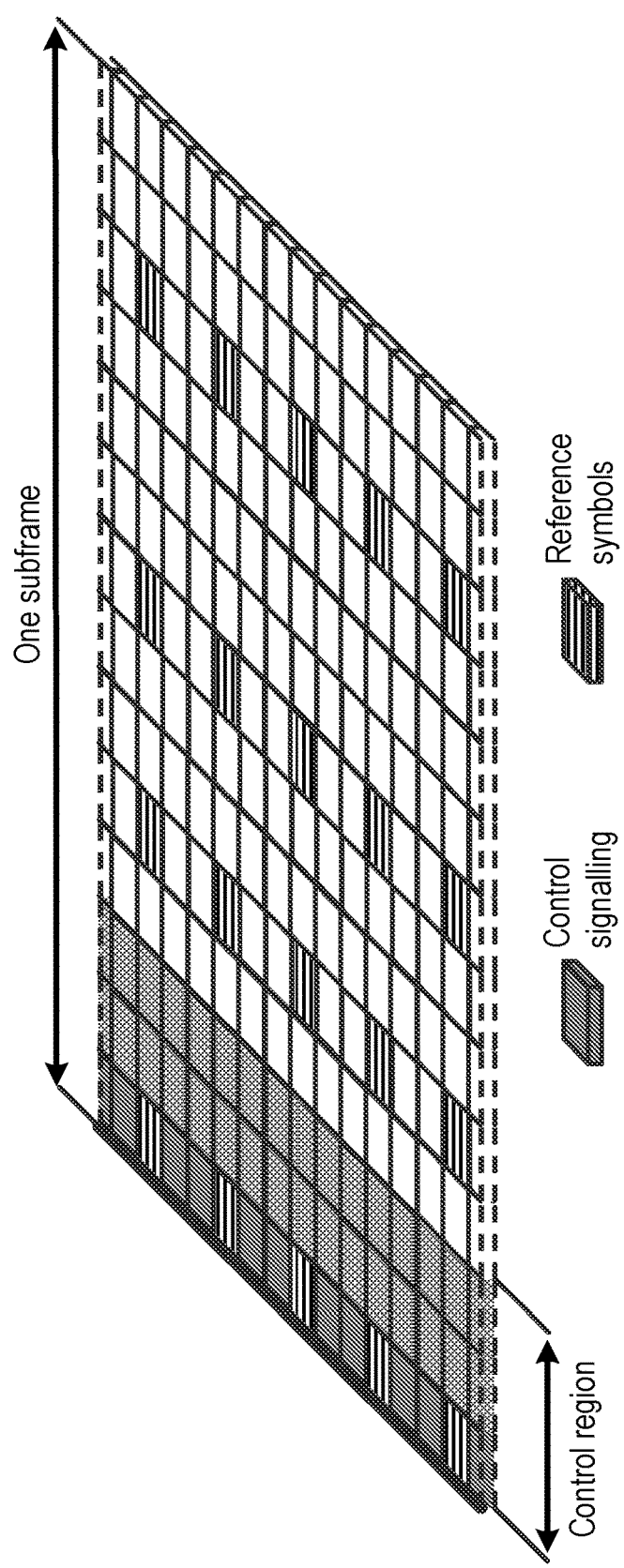
FIG. 3 illustrates control symbols and reference symbols in an LTE system.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, etc.

A cell is associated with a base station, where a base station comprises in a general sense any network node transmitting radio signals in the downlink (DL) and/or receiving radio signals in the uplink (UL). Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes, or WLAN access point (AP). A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

It should be noted that use of the term "network node" as used herein can refer to a base station, such as an eNodeB, a WLAN AP, a network node in the RAN responsible for resource management, such as a radio network controller (RNC), or, in some cases, a core network node, such as a mobility management entity (MME).

Figure 4:
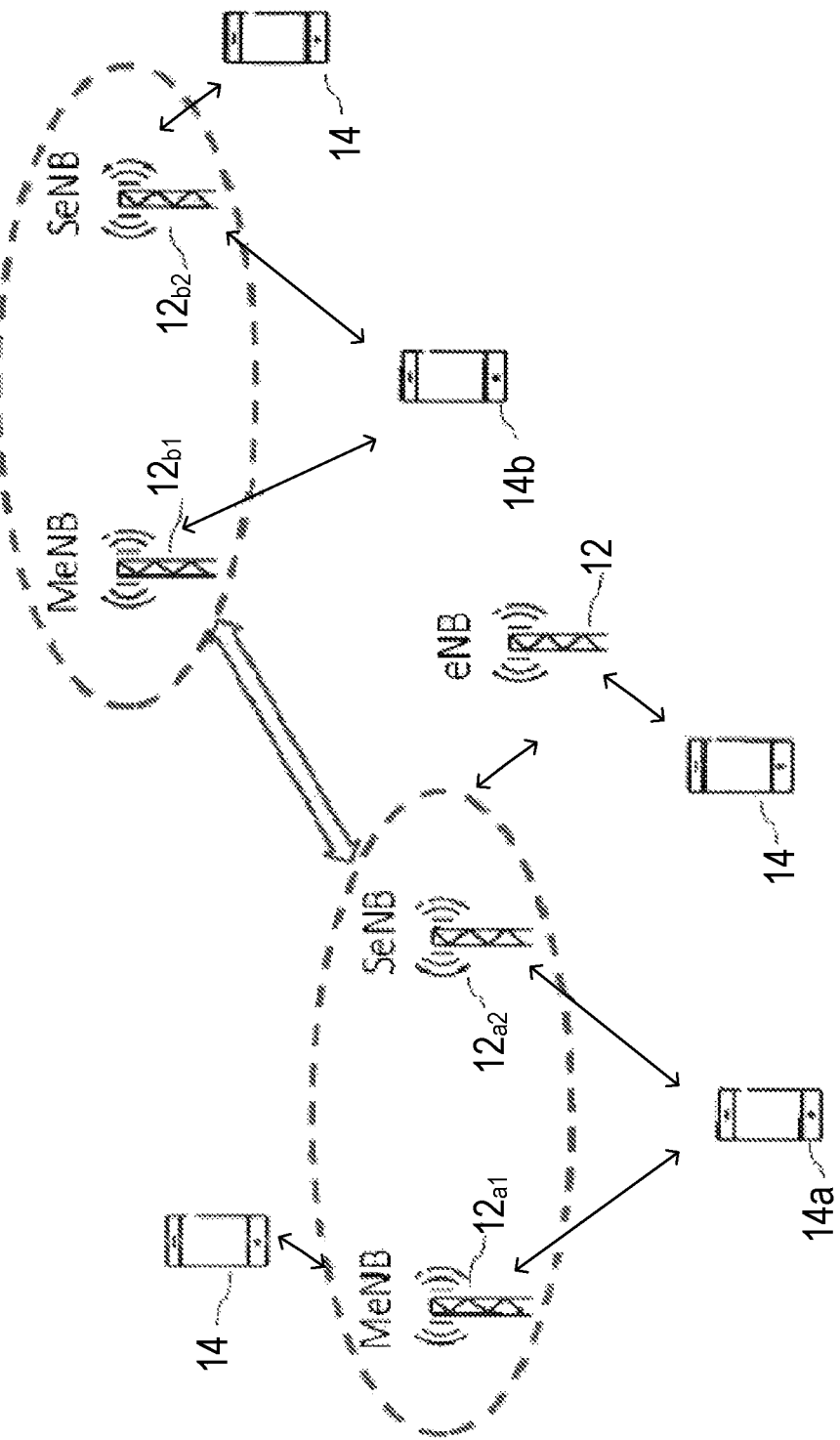
FIG. 4 illustrates a part of an LTE radio access network.

FIG. 4 illustrates a network 10 comprising basestations 12 and terminal devices 14. Some of the terminal devices are configured with a dual connectivity mode of operation. Therefore, the terminal device 14a may be connected to both basestations $12_{a1}$ and $12_{a2}$. The basestation $12_{a1}$ is acting as the Master Basestation and the basestation $12_{a2}$ is the Secondary Basestation. A backhaul link may connect the two basestations $12_{a1}$, $12_{a2}$, and this backhaul link may be non-ideal. Similarly the terminal device 14b is connected to both basestations $12_{b1}$ and $12_{b2}$, and a non-ideal backhaul link may connect the two basestations $12_{b1}$, $12_{b2}$. In this illustrated example, the basestations $12_{a1}$, $12_{a2}$ may be located very far from the basestations $12_{b1}$, $12_{b2}$.

More specifically dual connectivity (DC) is a mode of operation of a terminal device in a radio resource control connected state, where the terminal device is configured with a Master Cell Group (MCG) and a Secondary Cell Group (SCG). A cell Group (CG) is a group of serving cells associated with either the Master eNB (MeNB) or the Secondary eNB (SeN B).

Figure 5:
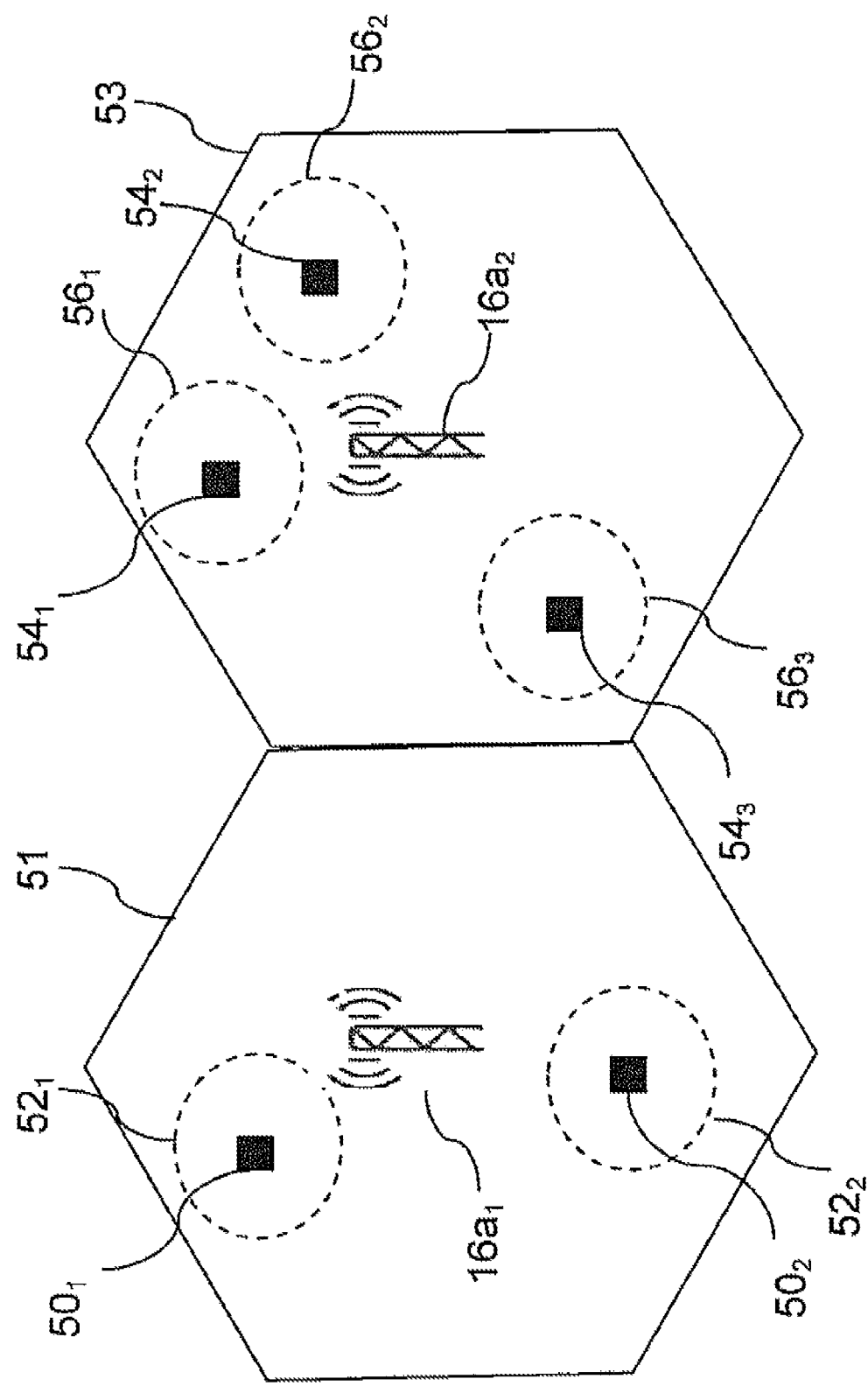
FIG. 5 illustrates a part of an LTE radio access network.

The Master Cell Group (MCG) is a group of serving cells associated with the MeNB, comprising of the Primary Cell (PCell) and optionally one or more Secondary Cells (SCells). For example, in FIG. 5 the MCG comprises the MeNB $16_{a1}$ serving the cell 51 and the basestations $50_1$ and $50_2$ with their respective cells $52_1$ and $52_2$.

The Secondary Cell Group (SCG) is a group of serving cells associated with the SeNB comprising of the PSCell (Primary SCell) and optionally one or more SCells. For example, in FIG. 5 the SCG comprises the SeNB $16_{a2}$ serving the cell 53 and the basestations $54_1$, $54_2$ and $54_3$ with their respective cells $56_1$, $56_2$ and $56_3$. It will be appreciated that the MCG and SCG may comprise any number of serving cells.

Figure 6:
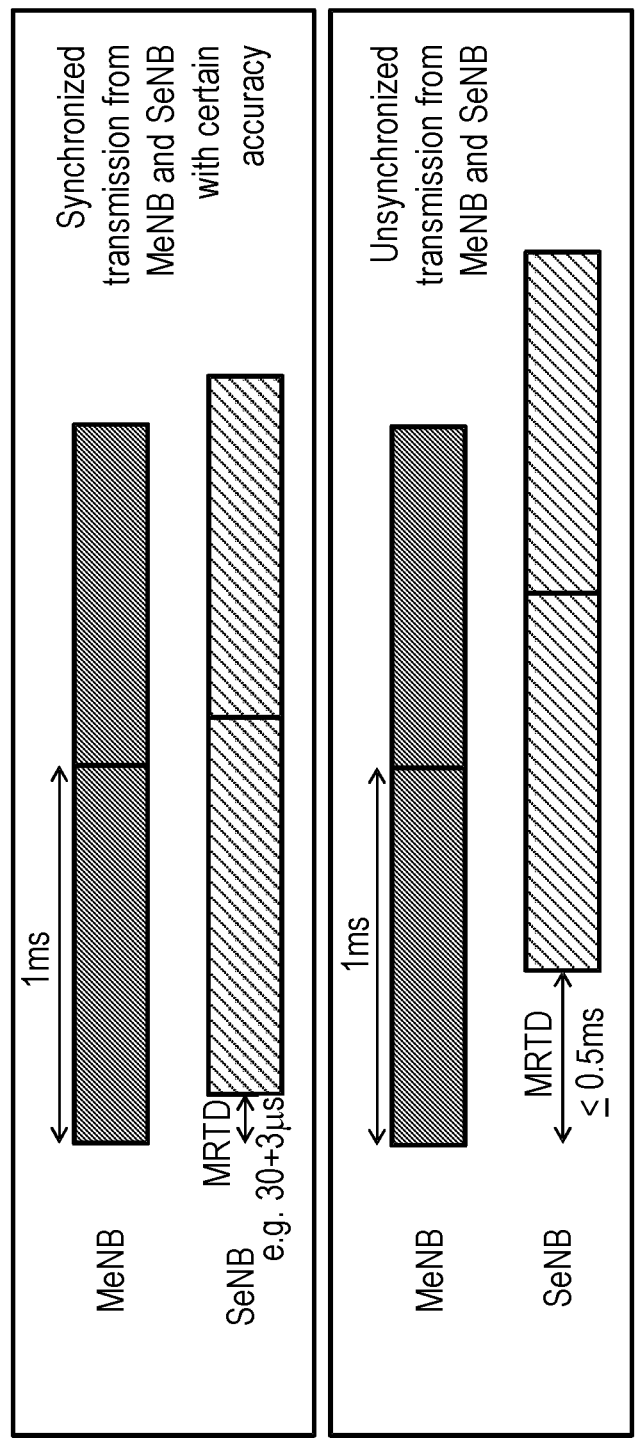
FIG. 6 illustrates timing of transmissions from eNodeBs in an LTE system.

In a Synchronized operation mode, the downlink timing for MeNB and SeNB is synchronized down to about half an OFDM symbol (about ±33 μs). Alternatively, in an unsynchronized operation mode, the downlink timing for MeNB and SeNB is synchronized down to half a subframe (±500 μs). FIG. 6 illustrates the maximum receive timing difference (MRTD) in synchronized and unsynchronized dual connectivity modes.

In LTE a Radio Resource Management measurement framework exists according to which an eNB can configure a terminal device to report to the network when the terminal device detects an LTE cell which has, for example, a signal strength above a configured threshold. The terminal device would, when configured with such a configuration, scan for LTE cells and, if the terminal device detects an LTE cell with signal strength above the configured threshold, trigger a measurement report.

The terminal device includes in this report measurements also for other cells, even those cells which do not have signal strength above the threshold.

The eNB uses these measurements to perform mobility procedures for the terminal device, e.g. to add additional cells for the terminal device to boost the terminal device's throughput.

To avoid a measurement report which is too large the terminal device includes measurements for a limited number of cells and the terminal device selects the cells based on how strong their signal strength/quality is.

According to current RRM measurement framework in LTE, the terminal device will report serving cells in the order of their signal strength, with the cell with the best signal first. Whilst this is suitable for performing actions such as handover etc, it will not be suitable for System Frame Number (SFN) and/or subframe difference reporting (SSTD). SSTD reporting involves the timing difference between PCell and a number of other cells, thus, the current definition of the "best signal first" is not usable any more for SSTD reporting.

SFN and subframe timing offset is defined based on the timing difference from MCG to SCG. It is essentially one measurement which reveals both the difference in SFNs and the receive time difference at the terminal device. In the specification the measurement can be specified in more compact form such as an "SSTD".

An SFN and subframe timing difference (SSTD) measurement report may comprise of three elements: the SFN offset between MeNB and SeNB ($\Delta X$), $$\Delta X = SFN_{PCell} - SFN_{PSCell}, \text{ where:}$$

$SFN_{PCell}$ and $SFN_{PSCell}$ are SFN numbers of PCell and PSCell respectively with a reporting range of for example, [−511, 512] in frame numbers; the Frame boundary offset between MeNB and SeNB ($\Delta Y$), $$\Delta Y = T_{FrameBoundaryPCell} - T_{FrameBoundaryPSCell}, \text{ where:}$$

$T_{FrameBoundaryPCell}$ is the time of PCell frame start $T_{FrameBoundaryPSCell}$ is the time of PSCell frame start closest to that of PCell, with a reporting range of for example [−4, 5] in subframe numbers; and the Subframe timing boundary offset between MeNB and SeNB ($\Delta Z$), $$\Delta Z = T_{SubframePCell} - T_{SubframePSCell}, \text{ where:}$$

$T_{SubframePCell}$ is the time when the terminal device receives the start of one subframe from PCell and $T_{SubframePSCell}$ is the time when the terminal device receives the corresponding start of one subframe from PSCell that is closest in time to the subframe received from PCell. The maximum possible value of $\Delta Z$ vary between −500 μs and +500 μs. However the terminal device will report $\Delta Z$ over a limited reporting range.

Whether the MCG or SCG can be seen as the leading CG can be used in many procedures related to dual connectivity. For example, based on whether MCG is leading or not, the SCG can determine which subframes to avoid for scheduling when gaps are configured.

This will provide useful information regarding the DRX or measurement gap length implementation. SFN offset will also provide indication on which subframes the interruption may happen in the PCell, PSCell or in the SCell(s) of either primary cell. This will also be helpful together with SFN offset to determine the exact subframes which will be affected to e.g. measurement gap length, DRX, etc.

Figure 7:
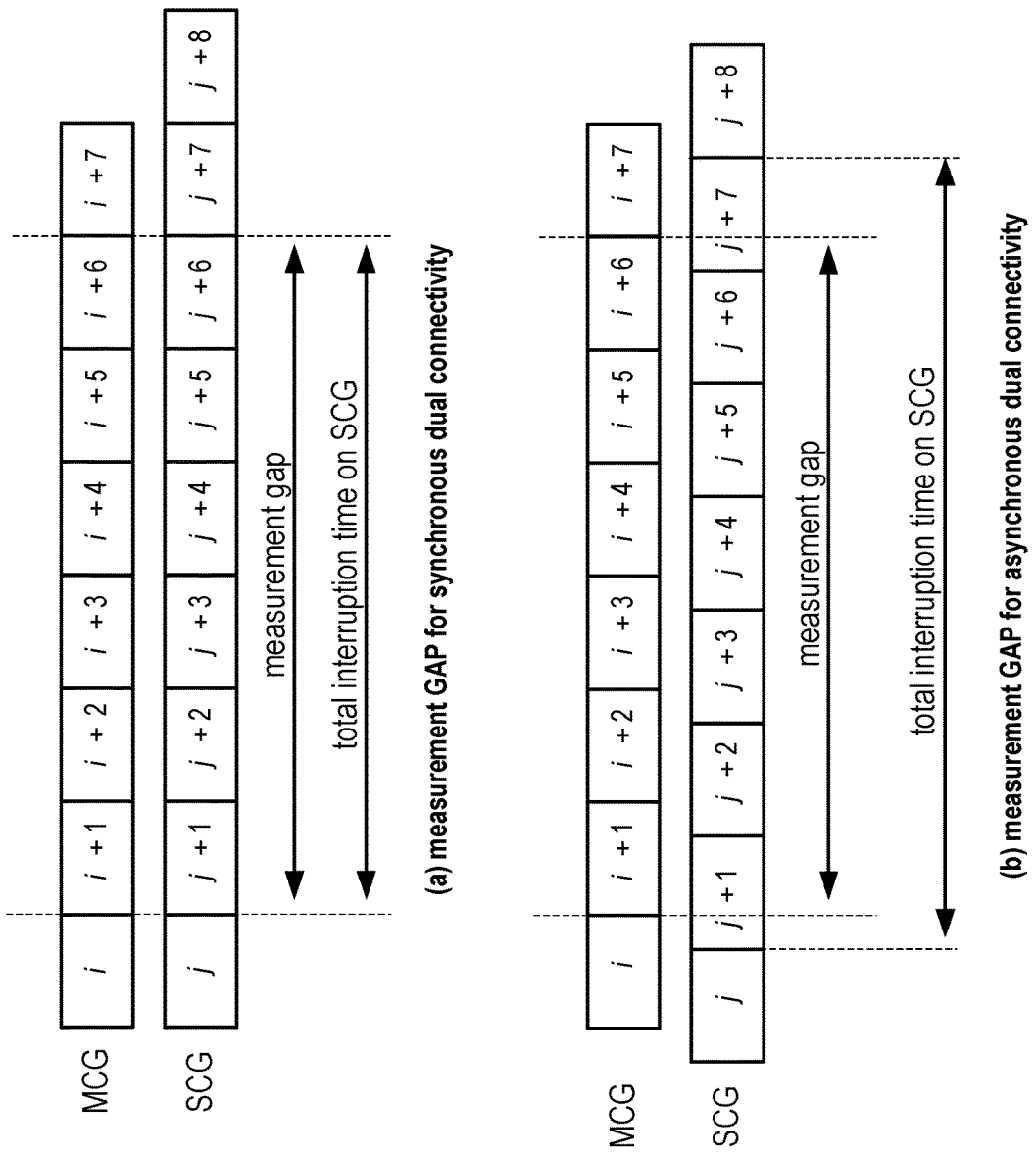
FIG. 7 illustrates the use of measurement gaps in an LTE system using dual connectivity.

The above two measurements are useful for determining e.g. where should the measurement gap be in both CGs, as seen in the FIG. 7.

A Subframe timing offset measurement will allow for determining whether synchronous or asynchronous dual connectivity can be supported for the terminal device.

This is component information which can be used to determine whether the terminal device can be served in synchronous or asynchronous fashion.

Figure 8:
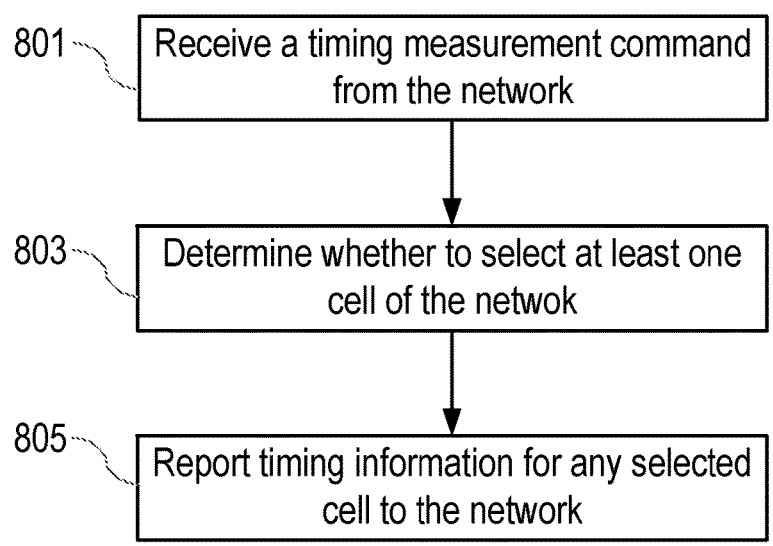
FIG. 8 is a flow chart illustrating a method performed by a terminal device.

FIG. 8 is a flowchart illustrating a method according to embodiments described in more detail below.

In step 801 the terminal device receives a timing measurement command from the network.

In step 803 the terminal device determines whether to select at least one cell of the network and in step 805 the terminal device reports timing information for any selected cell to the network. The timing information comprises information relating to a timing difference between the at least one selected cell and a reference cell.

The network, or a node in the network, can use the received report, containing the timing information, for any suitable purpose, such as selecting cells that can be used by the terminal device. For example, the terminal device may be able to handover to a cell mentioned in the report, or may be able to use a cell mentioned in the report as a primary cell PSCell of a secondary eNB (SeNB) or as a secondary serving cell SCell of the MeNB or SeNB.

The cellular communications network may be a Long Term Evolution, LTE, network. The timing measurement command may be received from an eNodeB of the network and the said timing information may be reported to an eNodeB of the network.

In some embodiments the timing information comprises information relating to a timing difference between the at least one selected cell and a reference cell. The reference cell may be a cell that is already configured for the user terminal.

In particular the timing information may comprise information relating to a subframe timing difference between the at least one selected cell and a reference cell, as measured at the terminal device.

In some embodiments the method further comprises in response to receiving the timing measurement command from the network, obtaining timing information for a plurality of cells of the network; and selecting only the one or more cell that meets at least one predetermined condition.

In some situations, the terminal device may determine that no cell should be selected. For example, the terminal device may be configured by the network command to send a report at predetermined times, in which case it will send a report even if it is unable to detect any other cell. In that case the report will be an empty report. In another example, the network may set a condition that only synchronous cells should be reported, and the terminal device may be unable to detect any suitable cell for synchronous operation. If the terminal device determines that no cell should be selected, it may send an empty report listing no cells, or it may simply send no report to the network.

A set of methods are described herein which can be applied when constructing a measurement report for timing differences for cells. They may be applied by an LTE terminal device when configured to send measurement reports to the eNB related to the timing difference between cells with respect to a reference cell. It will however be appreciated that the methods and apparatus described herein could be utilized within any telecommunications network.

In the descriptions below, we refer to a reference cell as the first cell or as PCell. A second cell or a third cell or a fourth cell and so on can be the cell that is (are) being measured. The PCell or the first cell or the reference cell is the cell that is already configured for the user terminal. In other examples the reference cell is a cell that is indicated to the terminal device by the network. This is useful if the network intends to change which cell the terminal device should be configured with, e.g. by doing a handover to a particular target cell, and hence the network would be interested in knowing what the timing difference is between that target cell and other cells, and so it is useful to designate that target cell as the reference cell.

In the forthcoming description, the term "subframe timing difference" is used to denote the received subframe timing difference at the terminal device. It is measured for the second cell with respect to the first cell.

In one embodiment the terminal device will only include a certain cell in the measurement report if the cell fulfills certain predetermined condition. Some example predetermined conditions are listed below.

For example, a predetermined condition to determine which cells are to be reported may be that the timing difference of a second cell compared to a first cell, referred to as "reference cell" (e.g. the PCell), should be below a certain threshold value.

The timing difference could be determined based on one or more metrics. For example, the subframe boundary offset, the frame boundary offset and the SFN offset.

The terminal device may consider one or several metrics. For example, the terminal device may only include a cell in the report if the subframe boundary offset between the cell compared to another cell (e.g. the PCell) is less than a threshold. Or the terminal device may consider both subframe boundary offset and frame boundary offset and then include a cell if the subframe boundary offset is less than a threshold and the frame boundary offset is less than a threshold. If multiple metrics are considered it would also be possible that OR-logic is applied; i.e. that the terminal device would include a cell in the report if either a first metric is less than threshold or a second metric is less than threshold.

Figure 9:
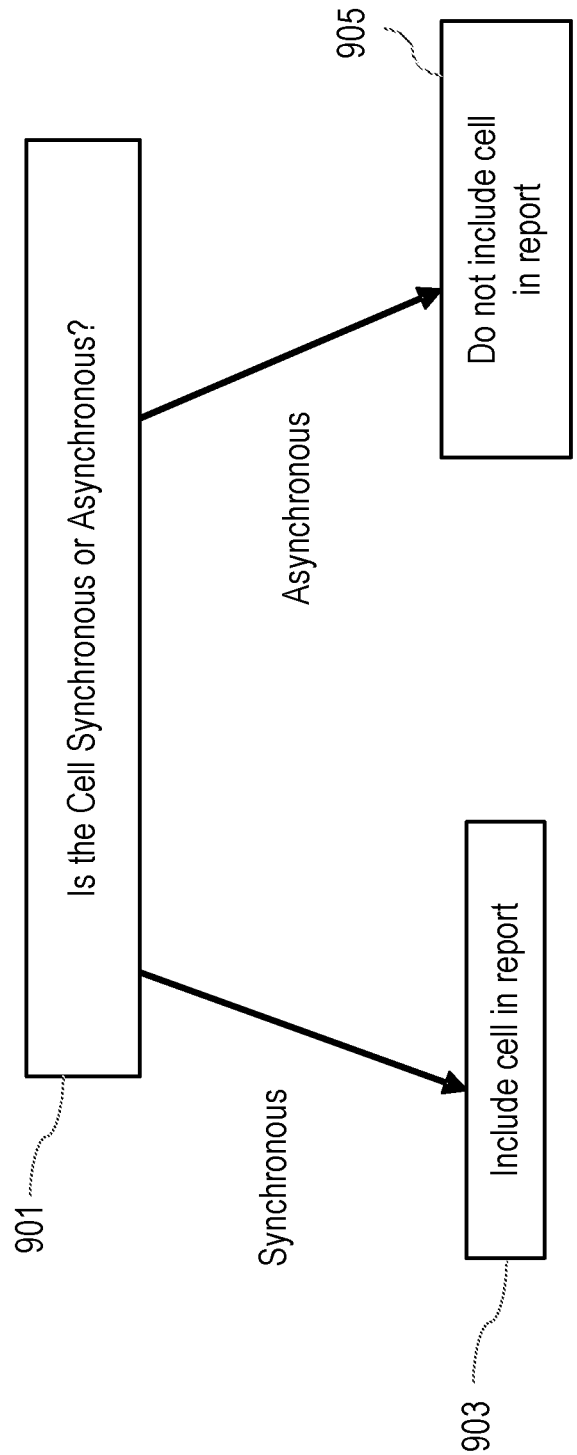
FIG. 9 is a flow chart illustrating a method performed by a terminal device.

FIG. 9 is a flowchart showing a method of determining whether to include a cell in the measurement report according to an embodiment.

In step 901 the terminal device determines whether a cell is synchronous or asynchronous. If a cell is synchronous it has a subframe timing difference of less than a specified threshold, for example, 33 μs.

If the cell is synchronous, the terminal device includes the cell in the report in step 903.

If the cell is not synchronous, the method passes to step 905 and the terminal device does not include the cell in the report.

This can be beneficial in the case where the terminal device only supports synchronous Dual Connectivity as the terminal device would not include in the report cells which could not provide synchronous dual connectivity to the particular terminal device. Hence the size of the report can be reduced by not including cells which cannot be configured for the terminal device regardless.

In some embodiments, the network indicates to the terminal device the thresholds to be used by the terminal device.

In certain embodiments, the threshold can be predefined and known to both the terminal device and the basestations.

Which metrics the terminal device considers for determining which cells are to be included in the report may be specified in a specification. For example, it may be specified that the terminal device should consider the metric "Subframe boundary offset". Another possibility is that the particular metrics to be considered are configured by the network. It would also be possible that in the case of an absence of any indication from the network of which metrics the terminal device shall consider, the terminal device may be able to select which metrics to consider based on a specification. However, if the network has provided an indication of which metrics should be considered, the terminal device may consider those metrics. In other words, in the absence of any indication from the network, the terminal device can apply a default rule with respect to which metrics to consider and the network can, if it deems necessary, refine these rules by providing an indication of which metrics the terminal device shall consider.

Figure 10:
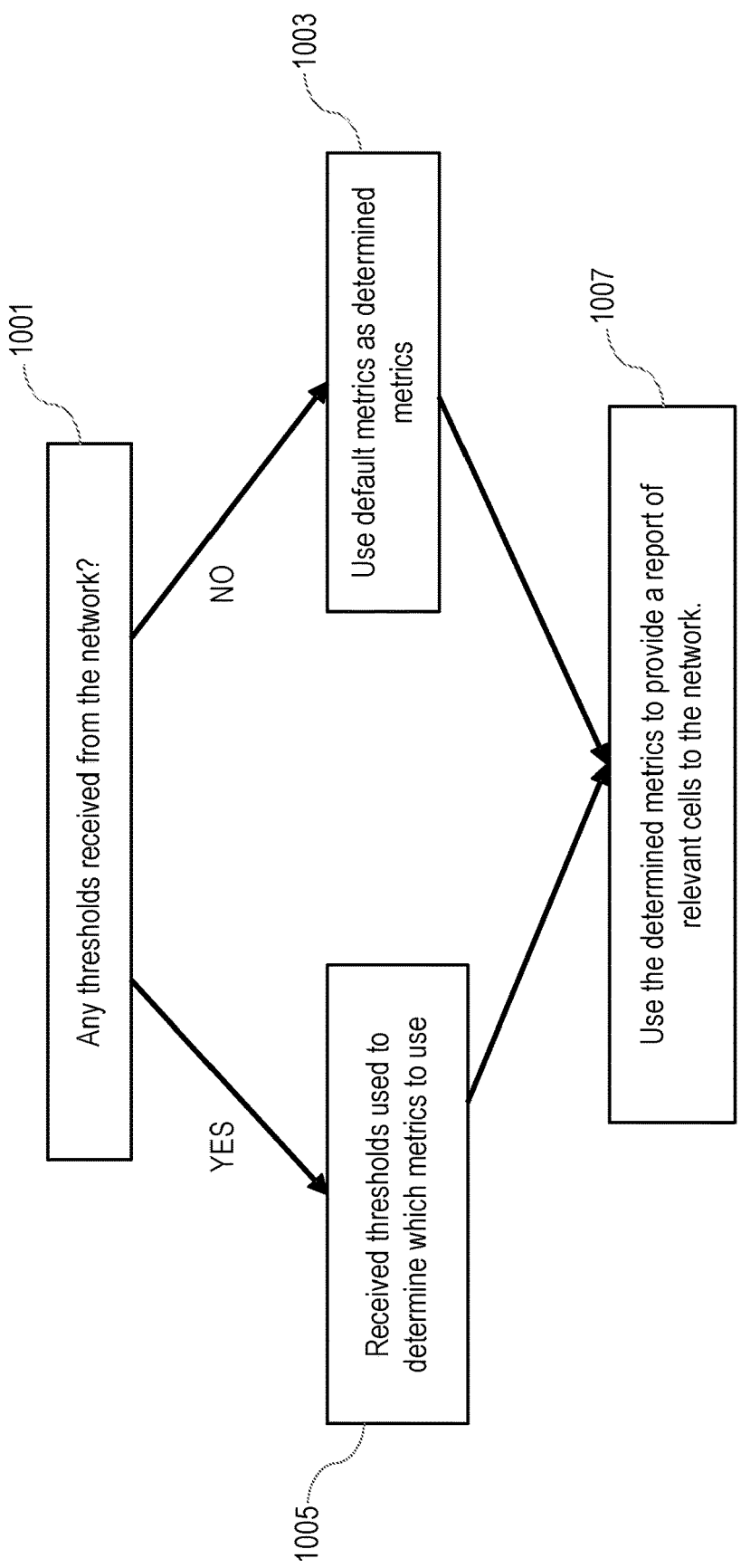
FIG. 10 is a flow chart illustrating a method performed by a terminal device.

FIG. 10 is a flowchart according to an embodiment.

In step 1001 the terminal device determines if it has received any thresholds from the network. For example, the terminal device may receive a threshold for the "Frame boundary offset" and/or for "Subframe boundary offset" and/or for "Subframe number offset".

If the terminal device has not received any thresholds from the network, the method passes to step 1003 in which the terminal device uses default metrics to determine which metrics to use. The method then passes to step 1007 in which the terminal device uses the metrics to provide a report of relevant cells to the network.

If the terminal device has received thresholds from the network, the method passes to step 1005 where the thresholds are used to determine which metrics to use. This way of implicitly indicating which metrics the terminal device shall consider will save signaling and hence system capacity will be improved as less signaling overhead will be created. The method then passes to step 1007 in which the terminal device uses the determined metrics to provide a report of the relevant cells to the network.

In some embodiments the terminal device considers its own capabilities when determining whether to include a certain cell in the report. As an example, the terminal device may include a cell in the report only if the terminal device is capable of performing Dual Connectivity with this cell.

In some embodiments the terminal device may be able to perform both synchronous and asynchronous Dual Connectivity. In other embodiments, the terminal device may only be able to perform synchronous Dual Connectivity or in other embodiments neither synchronous nor asynchronous Dual Connectivity. This may for example depend on which band combinations the cells are in. But it may also be so that a certain terminal device only supports synchronous Dual Connectivity (regardless of band combinations). So according to one embodiment the terminal device considers whether it is capable of performing Dual Connectivity with the cell in a particular scenario. Examples of methods which may be carried out by the terminal device to consider its own capabilities are shown in FIGS. 11 and 12.

Figure 11:
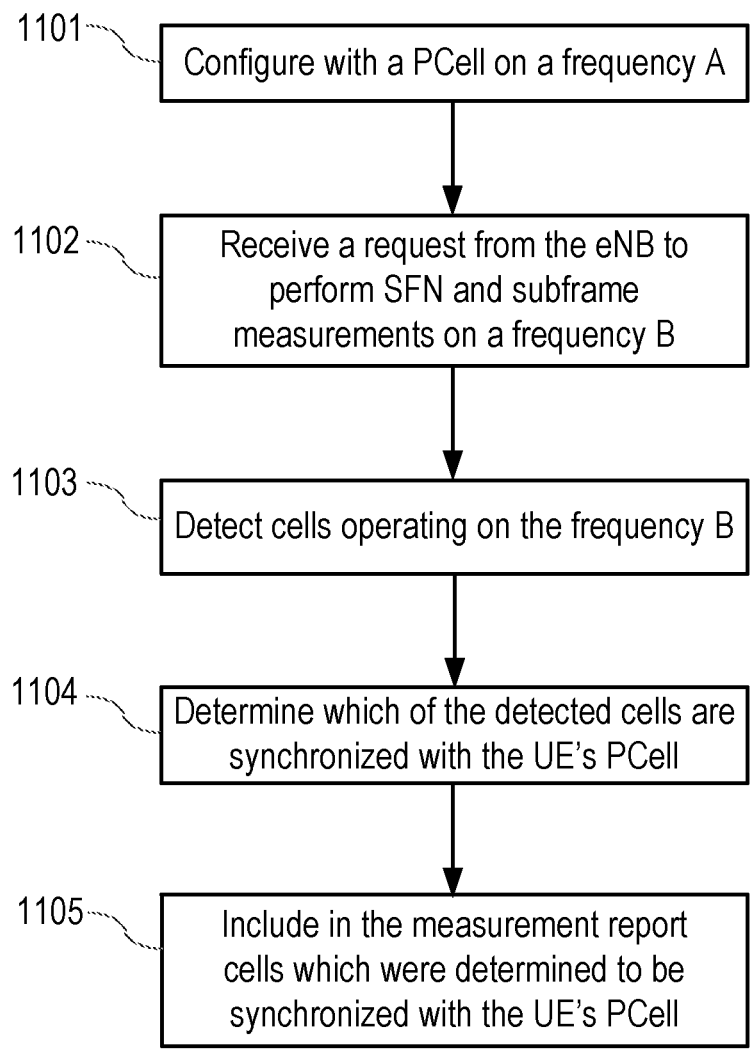
FIG. 11 is a flow chart illustrating a method performed by a terminal device.
Figure 12:
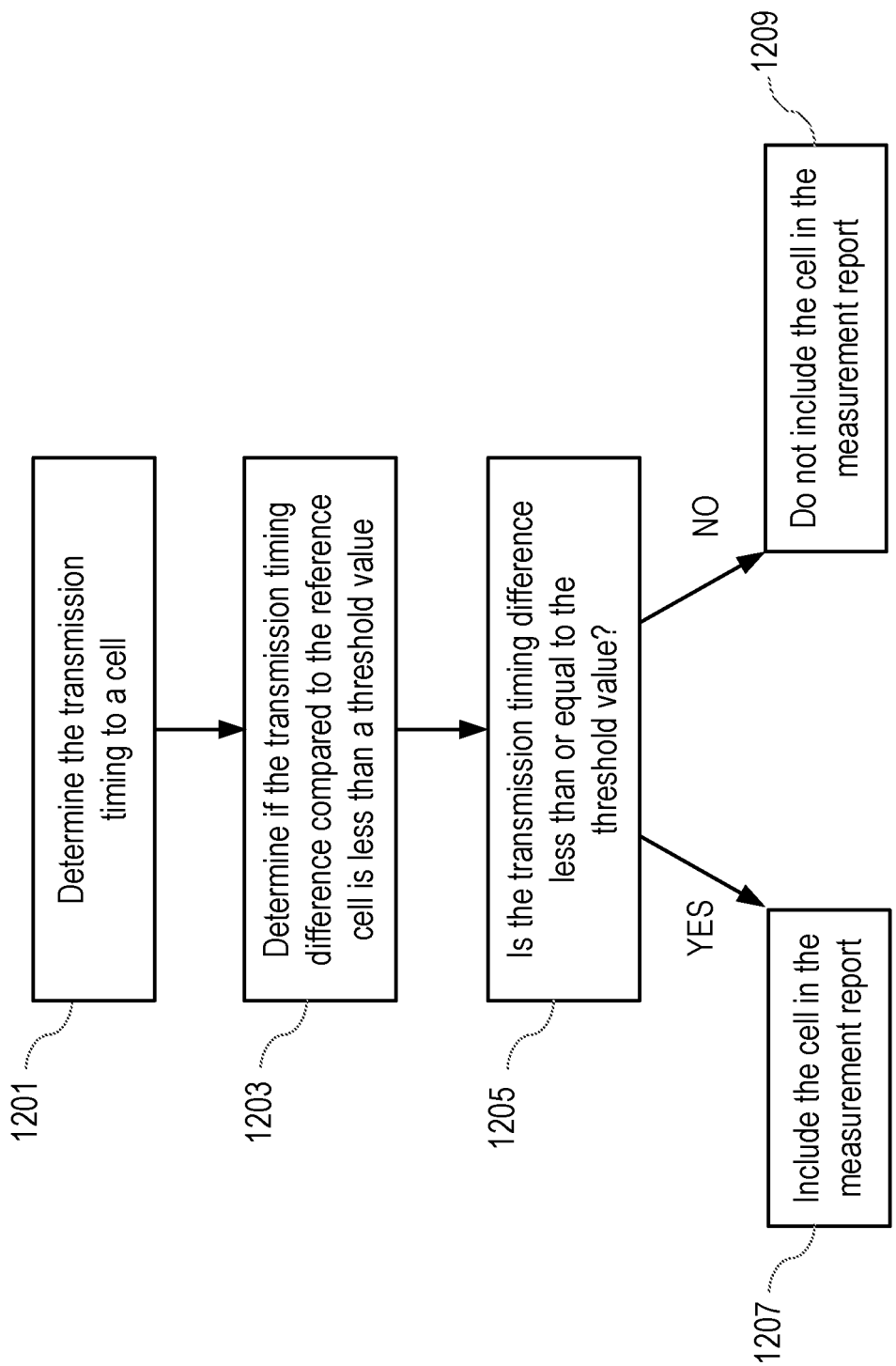
FIG. 12 is a flow chart illustrating a method performed by a terminal device.

FIG. 11 is a flowchart illustrating a method according to some embodiments where the terminal device is only able to perform synchronous Dual connectivity when operating on frequencies A and B.

In step 1101, the terminal device is configured with a PCell on a frequency A.

In step 1102 the terminal device receives a request from the eNB to perform SFN and subframe measurements on a frequency B. This may be done by receiving threshold values for the SFN and subframe measurements from the eNB.

In step 1103 the terminal device detects cells operating on the frequency B.

In step 1104 The terminal device determines which of the detected cells are synchronized with the terminal device's PCell.

In step 1105 the terminal device includes in the measurement report cells which were determined to be synchronized with the terminal device's PCell.

In this example, the frequencies A and B may be different. Alternatively, the frequencies A and B may be the same and the method proceeds in the same way.

FIG. 12 is a flowchart according to another embodiment wherein the terminal device may only support a transmission timing difference below or equal to a threshold value.

In step 1201 the terminal device determines the transmission timing to a cell.

In step 1203 the terminal device determines if the transmission timing difference compared to the reference cell is less than a threshold value.

If the transmission timing difference is less than or equal to the threshold value 1205, the method passes to step 1207, in which the terminal device includes the cell in the measurement report.

If the transmission timing difference is greater than the threshold value 1205, the method passes to step 1209, in which the terminal device does not include the cell in the measurement report. It should be noted that, in some cases, the synchronous and asynchronous capabilities of a terminal device may be related to the terminal devices capability of maximum uplink transmission timing difference. Whether or not the terminal device considers its own terminal device capabilities, for example as in FIGS. 11 and 12, may be configured by the network. This is beneficial as the terminal device may not know whether the network is requesting for it to perform the metrics with the intention to find a cell with which Dual Connectivity should be performed, or, for example, with the intention of determining the synchronization between nodes in the network. If the network intends to find a cell with which the terminal device shall perform Dual Connectivity, then the network may not be interested in getting measurements for a cell if the terminal device cannot perform Dual Connectivity using that cell. In this case, considering the terminal device's capabilities may be useful to discount any cells with which the Dual Connectivity could not be performed. Alternatively, if the network intends to determine the synchronization between nodes regardless of whether a particular terminal device would be able to perform Dual Connectivity with the cells, it may be unnecessary to include the terminal device's specific capabilities as the network is interested in information about all of the network nodes. Hence the network may indicate to the terminal device whether the terminal device shall consider its capabilities when configuring the terminal device measurements.

In some embodiments, the terminal device may report for the cells for which the resulting band combination involves two bands which are far apart in the frequency spectrum. Alternatively, the terminal device may only report for a band combination when the bands do not have any harmonics and/or intermodulation relations.

Figure 13:
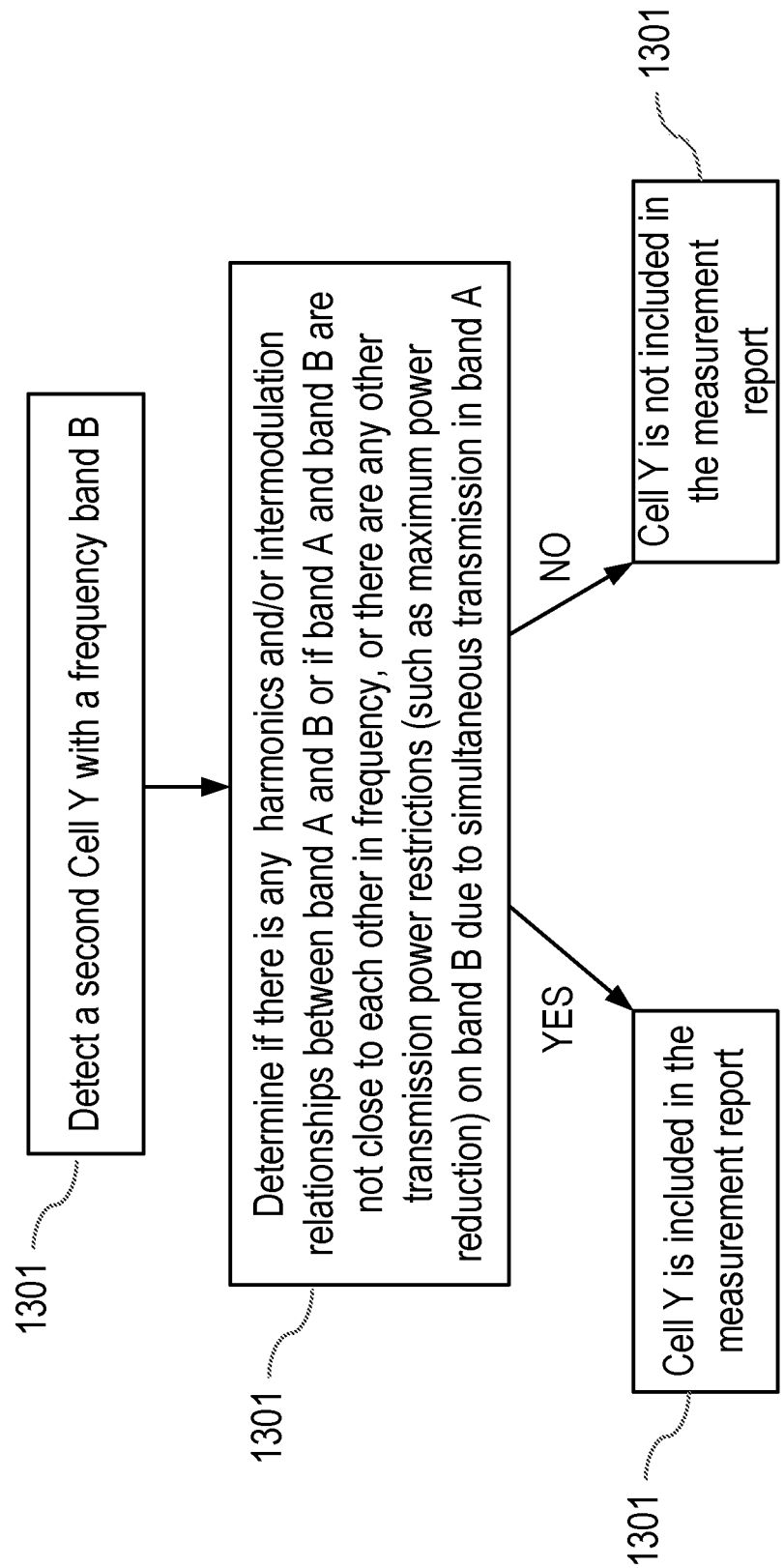
FIG. 13 is a flow chart illustrating a method performed by a terminal device.

For example, FIG. 13 illustrates a method carried out by a terminal device configured with a first Cell X (PCell or reference cell) with frequency band A.

In step 1301 the terminal device detects a second Cell Y with a frequency band B. The frequencies A and B may be different or they may be the same and the method proceeds in the same way.

In step 1303 the terminal device determines if there is any harmonics and/or intermodulation relationships between band A and band B or if band A and band B are not close to each other in frequency, or there are any other transmission power restrictions (such as maximum power reduction) on band B due to simultaneous transmission in band A.

If there are harmonics and/or intermodulation relationships between band A and band B, or band A and band B are not close to each other in frequency, or there are no other transmission power restrictions (such as MPR) on band B due to simultaneous transmission in band A then the method passes to step 1305 in which the Cell Y is included in the measurement report.

If there are no harmonics and/or intermodulation relationships between band A and band B, or band A and band B are close to each other in frequency, or there are other transmission power restrictions (such as MPR) on band B due to simultaneous transmission in band A then the method passes to step 1307 in which the Cell Y is not included in the measurement report.

In certain embodiments, a terminal device may choose to only report the measured cells which are of same duplex method as the first cell.

For example, only Time Division duplex (TDD) cells will be reported if the first cell or PCell is TDD. Similarly, only Frequency division duplex (FDD) cells will be reported if the first cell or PCell is FDD. In case of measurement report for substituting a PCell, an terminal device can select the cell with the duplex method similar to the PCell when reporting the SSTD back.

In some embodiments, in the measurement report, the terminal device may be configured to include a certain number (N) of serving cells. This number may be specified in a specification and/or signaled by the network. If there is a limit to the number of serving cells which the terminal device can include in the report it is important that relevant cells are included in the report. Below it will be provided different ways in which the terminal device can prioritize cells when creating the report.

It should be noted that a combination of the below prioritization rules may be applied. E.g. a "detected cell" is having higher priority than a "listed cell" if the "detected cell" has much better timing difference properties (e.g. the timing difference compared to the reference cell is much lower for the "detected cell" than for the "listed cell").

In some embodiments, the terminal device may prioritize cells which could be involved in synchronous dual connectivity. This means that the terminal device may include cells which can be used for asynchronous DC in the report but only if there is room left, e.g. if the terminal device has measured ten cells but is configured to only report eight cells and five cells are meeting a synchronous requirement but five do not meet such requirement, then the terminal device would first include the five cells with possibilities for synchronous DC (unless they have been excluded from the report due to some other reason) and following that the terminal device would include three of the cells which can be used for asynchronous DC.

It should be noted that the order in which the cells are listed in the report may also follow the below rules, for example, if prioritization is done based on timing difference, the terminal device may also list the cells included in the report according to timing difference.

In one embodiment the terminal device will include in the report the N cells which have the smallest timing difference compared to the reference cell. For example, if the N is 5 and the terminal device measures ten cells, then the terminal device may select, out of the ten measured cells, the five cells which have the lowest timing difference (e.g. lowest subframe timing difference) compared to the reference cell.

Another example embodiment could be that, the terminal device determines a threshold margin A, which can be used to determine the cells that need to be reported. In this embodiment, only the cells which satisfy the below conditions for the subframe timing difference are reported:

$$P_{subframetiming\_cell1} - P_{subframetiming\_cell2} > X + \Delta, \text{ and}$$

$$P_{subframetiming\_cell1} - P_{subframetiming\_cell2} < X - \Delta$$

Here, X is the receive timing difference that is defined in the specification. For example, this may be defined as 33 μs. Δ is the margin in μs, which can be determined by the terminal device, or can be signaled by the network to the terminal device. $P_{subframetiming\_cell1}$ and $P_{subframetiming\_cell2}$ are the subframe timing for the primary cell and the measured cell, respectively.

When determined by the terminal device, Δ can be the measurement uncertainty from terminal device side.

As there are several possible timing difference metrics the terminal device may select one timing difference metric to base the prioritization on. Which timing difference metric the terminal device prioritizes according to may be specified in a specification. Alternatively it may be signaled by the network. The network indication of which metric to prioritize according to may be indicated explicitly. Another possibility is that it is indicated implicitly, e.g. the terminal device prioritizes the cells according to the same threshold used to determine whether to include a cell or not.

In one embodiment prioritization is done considering the type of cell. Examples of different types of cells include "serving cells", "listed cells" and "detected cells".

Serving cells are cells which the terminal device is currently configured with. It may be important that the eNB knows the timing difference between such cells and the reference cell (e.g. the terminal device's PCell) for example to determine which power control mode the terminal device should be configured with. Hence the terminal device may give higher priority to a cell if it is considered to be a serving cell.

Listed cells are cells which the network has indicated to the terminal device in the measurement configuration. These cells are cells which the network may determine to be suitable candidate cells to be configured for the terminal device in a Dual Connectivity configuration. Hence it may be more important that the terminal device includes these cells in the measurement report rather than other cells which are not candidates for Dual Connectivity.

Other cells, which are not "serving cells" or "listed cells" but cells which the terminal device has detected are referred to as "detected cells". These cells may be suitable for the network to get a report of as network may not have initially known that they are close to the terminal device.

However, in case the report has a limited size it may be suitable that the terminal device performs prioritization based on which type the cells the terminal device has measured. The terminal device may prioritize serving cells in the following priority order: serving cells, listed cells and detected cells.

It may however be so that serving cells are included in a separate list, i.e. a different list than the list for "listed cells" and "detected cells".

In particular embodiments, the terminal device prioritizes the cells which are originally suggested by the network for potential measurement cells. In that way, terminal device will only include some detected cells if the total measurement report capability exceeds number of the network suggested cells.

In some embodiments the reference cell may be the terminal device's PCell. The terminal device is aware of which cell is its PCell and hence no signaling is needed for this approach.

In another example the reference cell is the cell indicated to the terminal device by the network. This is useful if the network intends to change which cell the terminal device should be configured with, e.g. by doing a handover, and hence the network would be interested in knowing what the timing difference is between the reference cell and other cells.

Figure 14:
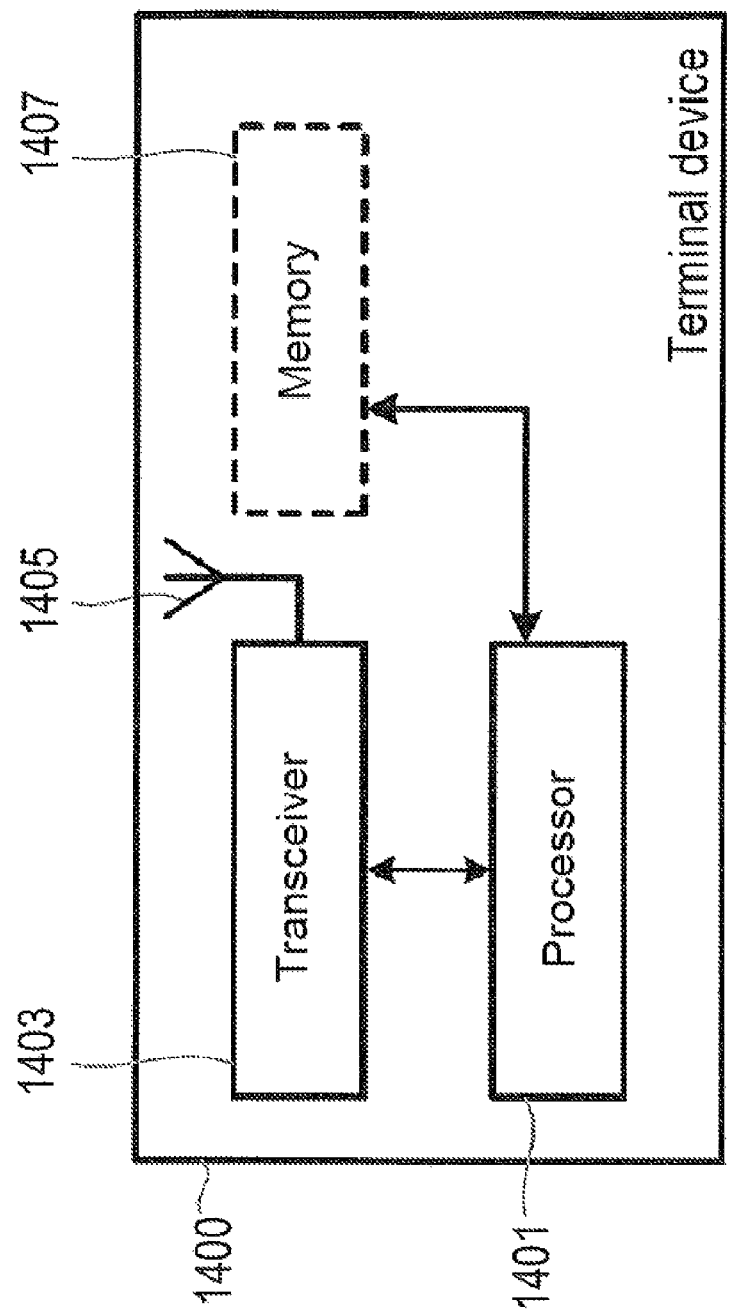
FIG. 14 illustrates a terminal device.

FIG. 14 shows a terminal device (terminal device) 1400 adapted or configured to receive a timing measurement command from the network, determine whether to select at least one cell of the network, and report timing information for any selected cell to the network, wherein said timing information comprises information relating to a timing difference between the at least one selected cell and a reference cell. The terminal device is adapted to operate according to one or more of the non-limiting example embodiments described. In an embodiment, the terminal device 1400 comprises a processor 1401 that controls the operation of the terminal device 1400. The processor 1401 is connected to a transceiver 1403 (which comprises a receiver and a transmitter) with associated antenna(s) 1405 which are used to transmit signals to and receive signals from a base station in a network and to transmit signals to and receive signals from an eNB. The processor 1401 and the transceiver 1403 are also configured or adapted to enable the terminal device 1400 to operate in Dual Connectivity mode.

The terminal device 1400 also comprises a memory 1407 that is connected to the processor 1401 and that contains instructions or computer code executable by the processor 1401 and other information or data required for the operation of the terminal device 1400.

The transceiver 1403 may be configured to receive a timing measurement command from the network. The processor may be configured to select at least one cell of the network and report timing information for the at least one selected cell to the network.

Figure 18:
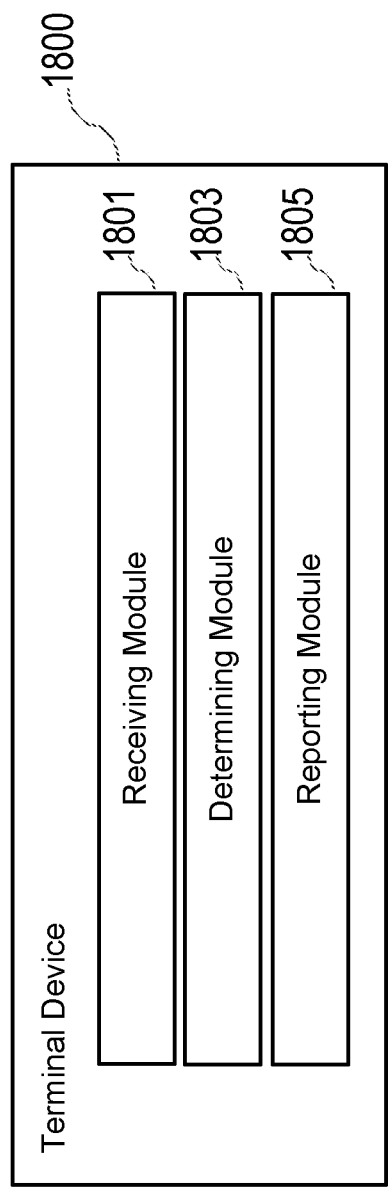
FIG. 18 shows a terminal device for use in a cellular communications network.

FIG. 18 shows an alternative implementation of a terminal device 1800 for use in a cellular communications network. The terminal device comprises: a receiving module 1801 for receiving timing measurement command from the network; a determining module 1803 for determining whether to select at least one cell of the network; and a reporting module 1805 for reporting timing information for any selected cell to the network, wherein said timing information comprises information relating to a timing difference between the at least one selected cell and a reference cell.

Figure 15:
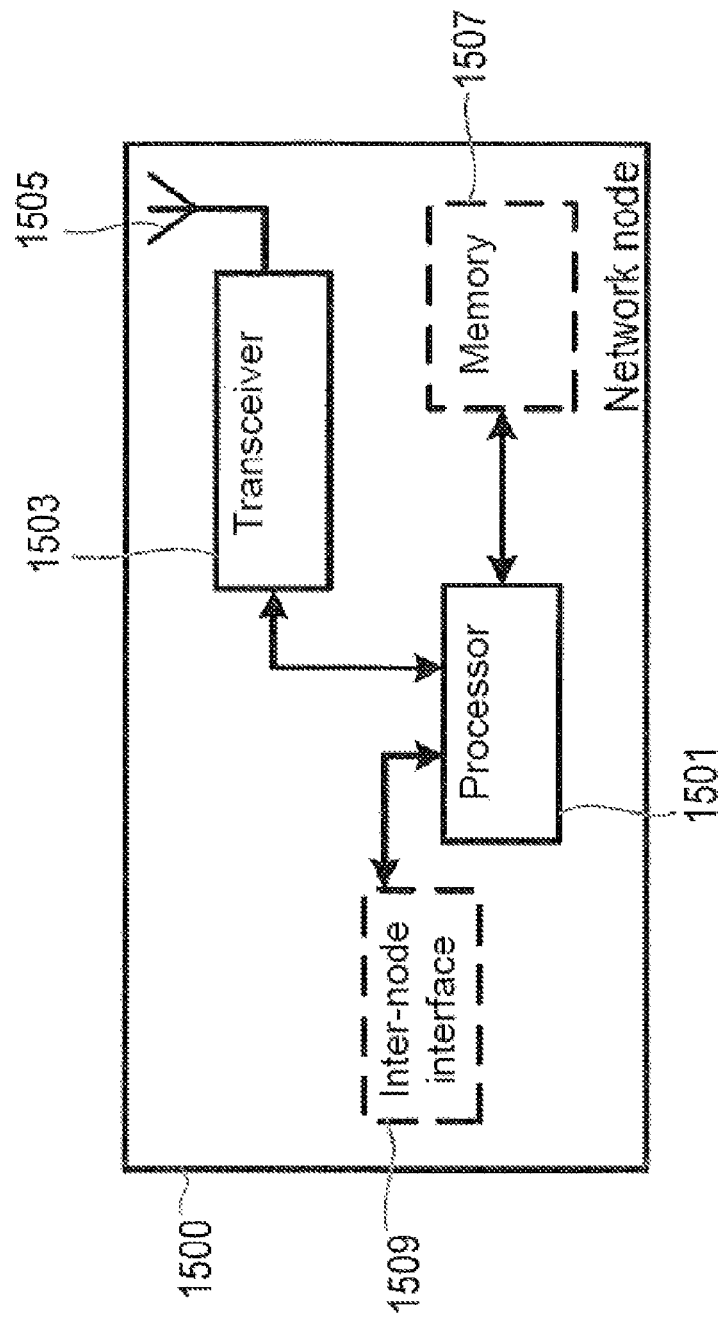
FIG. 15 illustrates a network node.

FIG. 15 shows a network node (for example a base station such as a NodeB or an eNodeB, or a WLAN AP) that can be adapted or configured to send a timing measurement command to a terminal device in the cellular communications network, and receive from the terminal device a report containing timing information for at least one selected cell in the network, wherein said timing information comprises information relating to a timing difference between the at least one selected cell and a reference cell, wherein said timing information comprises information relating to a timing difference between the at least one selected cell and a reference cell. The network node is adapted to operate according to the example embodiments described. In an embodiment, the network node 1500 comprises a processor 1501 that controls the operation of the network node 1500. The processor 1501 is connected to a transceiver 1503 (which comprises a receiver and a transmitter) with associated antenna(s) 1505 which are used to transmit signals to, and receive signals from, terminal devices in a network. The network node 1500 also comprises a memory 1507 that is connected to the processor 1501 and that contains instructions or computer code executable by the processor 1501 and other information or data required for the operation of the network node 1500. The network node 1500 also includes components and/or circuitry 1509 for allowing the network node 1500 to exchange information with another network node 1500 (for example via an X2 and/or S1 interface). It will be appreciated that base stations for use in other types of network (e.g. UTRAN or Wideband Code Division Multiple Access (WCDMA) radio access network (RAN)) will include similar components to those shown in FIG. 15 and appropriate interface circuitry 1509 for enabling communications with the other network nodes in those types of networks (e.g. other base stations, mobility management nodes and/or nodes in the core network).

The transceiver 1503 may be configured to send a timing measurement command to a terminal device in the cellular communications network. The transceiver 1503 may also be configured to receive from the terminal device a report containing timing information for at least one selected cell in the network.

Figure 19:
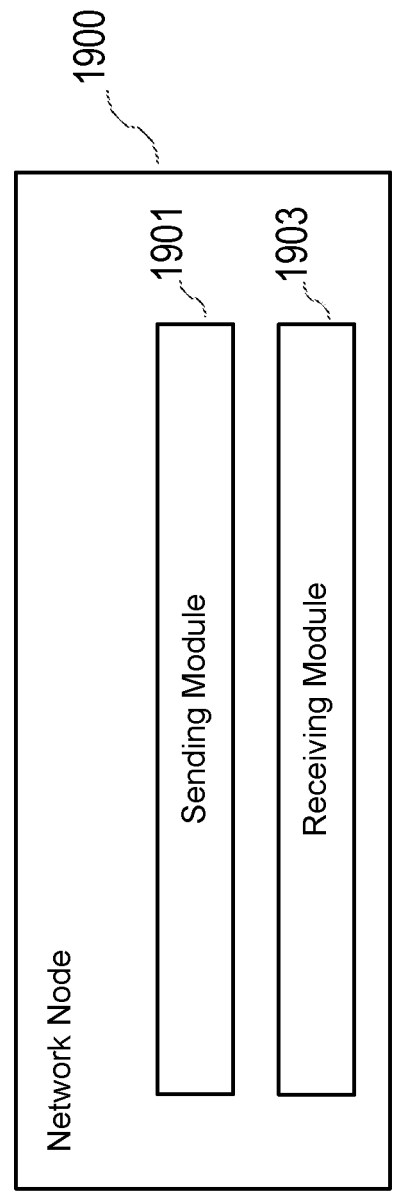
FIG. 19 shows a network node for use in a cellular communications network.

FIG. 19 shows an alternative implementation network node 1900 for use in a cellular communications network. The network node comprises: a sending module 1901 for sending a timing measurement command to a terminal device in the cellular communications network; and a receiving module 1903 for receiving from the terminal device a report containing timing information for at least one selected cell in the network wherein said timing information comprises information relating to a timing difference between the at least one selected cell and a reference cell.

Figure 16:
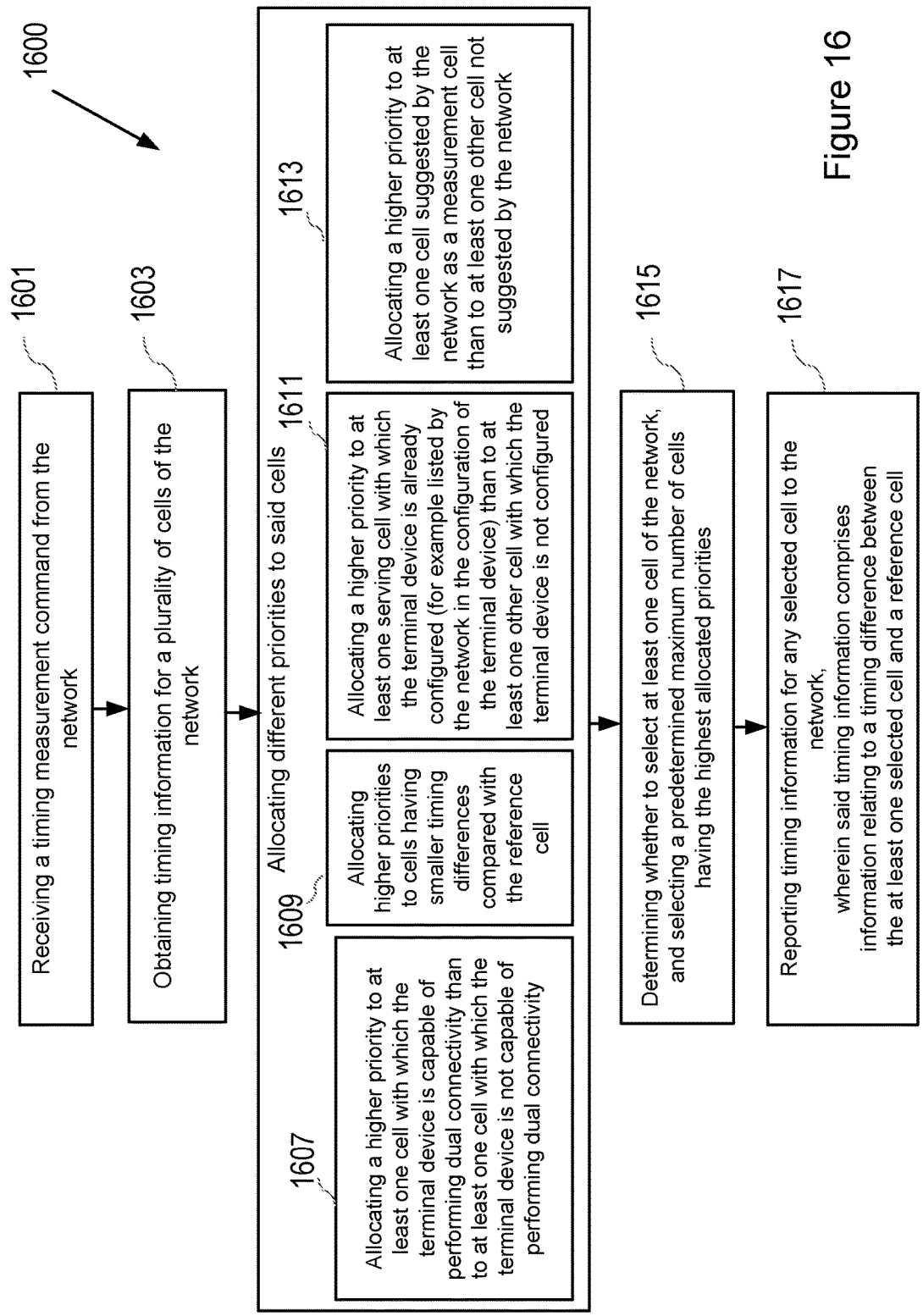
FIG. 16 shows a method performed in a terminal device.

FIG. 16 shows a method 1600 performed in a terminal device. In step 1601 the terminal device receives a timing measurement command from the network. In step 1603 the terminal device obtains timing information for a plurality of cells of the network.

In step 1605, the terminal device allocates different priorities to said cells. For example, this may include: allocating a higher priority to at least one cell with which the terminal device is capable of performing dual connectivity than to at least one cell with which the terminal device is not capable of performing dual connectivity, as shown at step 1607; and/or allocating priorities to said cells based on respective timing differences of the cells compared with a reference cell, and allocating higher priorities to cells having smaller timing differences compared with the reference cell, as shown at step 1609; and/or allocating a higher priority to at least one serving cell with which the terminal device is already configured (for example a cell listed by the network in the configuration of the terminal device) than to at least one other cell with which the terminal device is not configured, as shown at step 1611; and/or allocating a higher priority to at least one cell suggested by the network as a measurement cell than to at least one other cell not suggested by the network, as shown at step 1613.

In step 1615, the terminal device determines whether to select at least one cell of the network, and, if so, selects a predetermined maximum number of said cells having the highest allocated priorities. In step 1617, the terminal device reports timing information for any selected cell to the network, wherein said timing information comprises information relating to a timing difference between the at least one selected cell and a reference cell.

Figure 17:
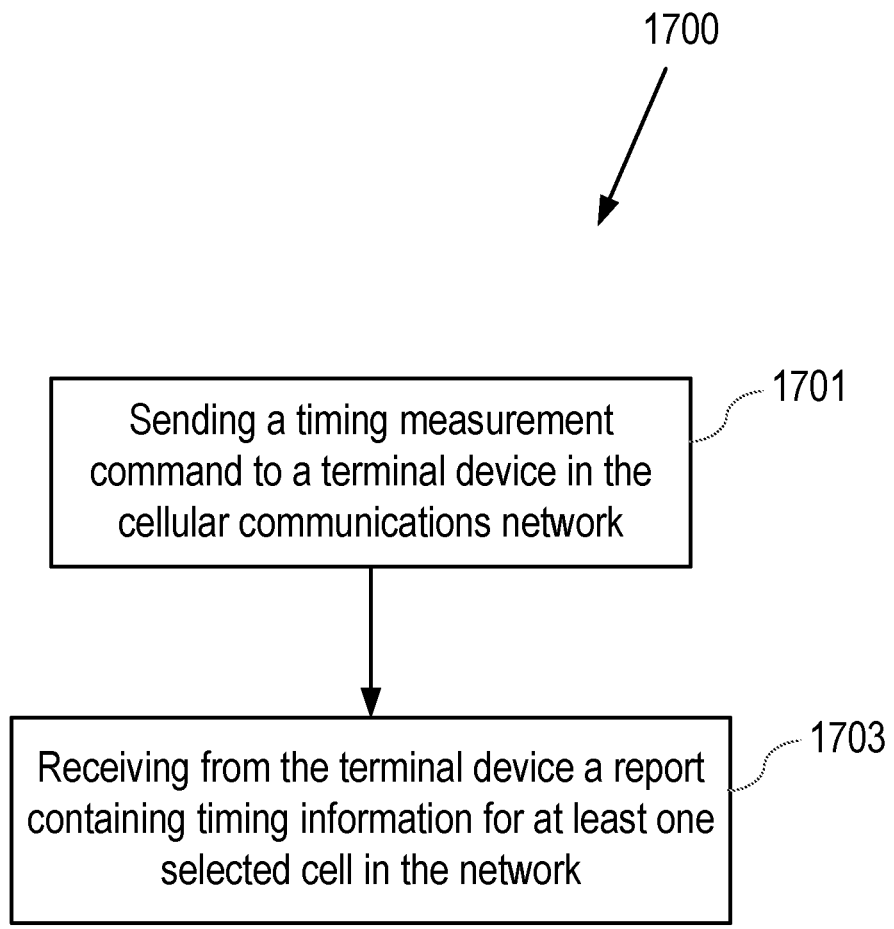
FIG. 17 shows a method performed in a network node.

FIG. 17 shows a method 1700 performed in a network node. Thus, in step 1701 the network node sends a timing measurement command to a terminal device in the cellular communications network. In step 1703 the network node receives from the terminal device a report containing timing information for at least one selected cell in the network.

Sending the timing measurement command to the terminal device may comprise: notifying to the terminal device a timing difference threshold value; and/or notifying to the terminal device a metric to be used by the terminal device in measuring the timing difference; and/or notifying to the terminal device a cell to be used as a reference cell for measuring the timing difference.

There is therefore provided a method of operating a terminal device in a cellular communications network and of reporting timing information for at least of cell of the network to the network.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of operating a terminal device in a cellular communications network providing Dual Connectivity, wherein the terminal device is connected to a Master Cell Group (MCG) comprising a Primary Cell (PCell), and wherein the PCell is associated with a Master eNB (MeNB), the method comprising:

receiving a timing measurement command from the network for measuring a System Frame Number and Subframe Timing Difference (SSTD);

obtaining timing information for a plurality of cells of the network;

allocating different priorities to respective cells in the plurality of cells; and reporting, to the network, timing information for a subset of the plurality of cells having the highest priorities, wherein the timing information comprises information relating to a timing difference between a reference cell and each cell in the subset wherein the reference cell is the Pcell, wherein the subset contains a predetermined maximum number of cells having the highest priorities among the cells included in the plurality of cells.

2. The method as defined in claim 1, wherein the allocating comprises:

allocating a higher priority to at least one cell with which the terminal device is capable of performing dual connectivity than to at least one cell with which the terminal device is not capable of performing dual connectivity.

3. The method as defined in claim 1, wherein the allocating comprises:

allocating priorities to respective cells in the plurality of cells based on respective timing differences of the cells compared with a reference cell, allocating higher priorities to cells having smaller timing differences compared to the reference cell.

4. The method as defined in claim 1, wherein the allocating comprises:

allocating a higher priority to at least one serving cell with which the terminal device is already configured than to at least one other cell with which the terminal device is not configured.

5. The method as defined in claim 1, wherein the allocating comprises:

allocating a higher priority to at least one cell listed by the network in a configuration of the terminal device than to at least one other cell detected by the terminal device but not listed by the network in the configuration of the terminal device.

6. The method as defined in claim 1, wherein the allocating comprises:

allocating a higher priority to at least one cell suggested by the network as a measurement cell than to at least one other cell not suggested by the network.

7. A non-transitory computer readable medium storing a computer program for operating a terminal device in a cellular communications network providing Dual Connectivity, wherein the terminal device is connected to a Master Cell Group (MCG) comprising a Primary Cell (PCell), and wherein the PCell is associated with a Master eNB (MeNB), the computer program having computer readable code that, when executed by a processor of the terminal device, causes the terminal device to:

receive a timing measurement command from the network for measuring a System Frame Number and Subframe Timing Difference (S STD);

obtain timing information for a plurality of cells of the network;

allocate different priorities to respective cells in the plurality of cells; and report, to the network, timing information for a subset of the plurality of cells having the highest priorities, wherein the timing information comprises information relating to a timing difference between a reference cell and each cell in the subset, wherein the reference cell is the Pcell, wherein the subset contains a predetermined maximum number of cells having the highest priorities among the cells included in the plurality of cells.

8. A terminal device configured for use in a cellular communications network providing Dual Connectivity, wherein the terminal device is connected to a Master Cell Group (MCG) comprising a Primary Cell (PCell), and wherein the PCell is associated with a Master eNB (MeNB), the terminal device comprising:

transceiver circuitry configured for communicating with the network; and processing circuitry operatively associated with the transceiver circuitry and configured to:

receive a timing measurement command from the network for measuring a obtain timing information for a plurality of cells of the network;

allocate different priorities to respective cells in the plurality of cells; and report, to the network, timing information for a subset of the plurality of cells having the highest priorities, wherein the timing information comprises information relating to a timing difference between a reference cell and each cell in the subset, wherein the reference cell is the Pcell, wherein the subset contains a predetermined maximum number of cells having the highest priorities among the cells included in the plurality of cells.

9. The terminal device as defined in claim 8, wherein the processing circuitry is configured to:

allocate a higher priority to at least one cell with which the terminal device is capable of performing dual connectivity than to at least one cell with which the terminal device is not capable of performing dual connectivity.

10. The terminal device as defined in claim 8, wherein the processing circuitry is configured to:

allocate priorities to respective cells in the plurality of cells based on respective timing differences of the cells compared with a reference cell, allocating higher priorities to cells having smaller timing differences compared to the reference cell.

11. The terminal device as defined in claim 8, wherein the processing circuitry is configured to:

allocate a higher priority to at least one serving cell with which the terminal device is already configured than to at least one other cell with which the terminal device is not configured.

12. The terminal device as defined in claim 8, wherein the processing circuitry is configured to:

allocate a higher priority to at least one cell listed by the network in a configuration of the terminal device than to at least one other cell detected by the terminal device but not listed by the network in the configuration of the terminal device.

13. The terminal device as defined in claim 8, wherein the processing circuitry is configured to:

allocate a higher priority to at least one cell suggested by the network as a measurement cell than to at least one other cell not suggested by the network.

* * * * *